(12) United States Patent
Serrano et al.

(10) Patent No.: US 9,878,718 B2
(45) Date of Patent: *Jan. 30, 2018

(54) COORDINATION OF VEHICLE ACTUATORS DURING FIRING FRACTION TRANSITIONS

(71) Applicant: Tula Technology, Inc., San Jose, CA (US)

(72) Inventors: Louis J. Serrano, Los Gatos, CA (US); Steven E. Carlson, Oakland, CA (US)

(73) Assignee: Tula Technology, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/288,847

(22) Filed: Oct. 7, 2016

(65) Prior Publication Data

US 2017/0369063 A1    Dec. 28, 2017

Related U.S. Application Data

(60) Provisional application No. 62/353,674, filed on Jun. 23, 2016.

(51) Int. Cl.
*B60W 30/188* (2012.01)
*F02D 17/02* (2006.01)
*F02D 41/00* (2006.01)
*F02D 41/02* (2006.01)
*B60W 10/02* (2006.01)
*B60W 10/06* (2006.01)

(52) U.S. Cl.
CPC ........ *B60W 30/188* (2013.01); *B60W 10/023* (2013.01); *B60W 10/06* (2013.01); *F02D 17/02* (2013.01); *F02D 41/0087* (2013.01); *F02D 41/0215* (2013.01); *B60W 2710/025* (2013.01)

(58) Field of Classification Search
CPC .. B60W 10/023; B60W 10/06; B60W 30/188; B60W 2710/025; F02D 17/02; F02D 41/0087; F02D 41/0215
See application file for complete search history.

(56) References Cited

U.S. PATENT DOCUMENTS

| 4,129,109 A | 12/1978 | Matsumoto |
| 4,434,767 A | 3/1984 | Kohama et al. |
| 4,489,695 A | 12/1984 | Kohama et al. |

(Continued)

OTHER PUBLICATIONS

Serrano et al., U.S. Appl. No. 15/298,542, filed Oct. 20, 2016.

(Continued)

*Primary Examiner* — Huan Le
(74) *Attorney, Agent, or Firm* — Beyer Law Group LLP

(57) ABSTRACT

A variety of methods and arrangements are described for controlling transitions between firing fractions during skip fire and potentially variable displacement operation of an engine. In general, actuator first transition strategies are described in which an actuator position (e.g., cam phase, TCC slip, etc.) is changed to, or close to a target position before i corresponding firing fraction change is implemented. When the actuator change associated with a desired firing fraction change is relatively large, the firing fraction change is divided into a series of two or more firing fraction change steps. A number of intermediate target selection schemes are described as well.

21 Claims, 7 Drawing Sheets

(56) References Cited

U.S. PATENT DOCUMENTS

| | | | |
|---|---|---|---|
| 4,509,488 A | 4/1985 | Forster et al. | |
| 5,377,631 A | 1/1995 | Schecter | |
| 5,975,052 A | 11/1999 | Moyer | |
| 6,158,411 A | 12/2000 | Morikawa | |
| 6,619,258 B2 | 9/2003 | McKay et al. | |
| 6,843,752 B2 | 1/2005 | Bolander | |
| 6,978,204 B2 | 12/2005 | Surnilla et al. | |
| 7,032,545 B2 | 4/2006 | Lewis et al. | |
| 7,063,062 B2 | 6/2006 | Lewis et al. | |
| 7,066,136 B2 | 6/2006 | Ogiso | |
| 7,086,386 B2 | 8/2006 | Doering | |
| 7,179,199 B2 | 2/2007 | Kushiyama et al. | |
| 7,231,907 B2 | 6/2007 | Bolander et al. | |
| 7,288,046 B2 | 10/2007 | Boone et al. | |
| 7,426,915 B2 | 9/2008 | Gibson et al. | |
| 7,503,312 B2 | 3/2009 | Surnilla et al. | |
| 7,532,972 B2 | 5/2009 | Kolmanovsky et al. | |
| 7,577,510 B2 | 8/2009 | Fodor et al. | |
| 7,577,511 B1 | 8/2009 | Tripathi et al. | |
| 7,651,441 B2 | 1/2010 | Maguire et al. | |
| 7,785,230 B2 | 8/2010 | Gibson et al. | |
| 7,930,087 B2 | 4/2011 | Gibson et al. | |
| 8,052,575 B2 | 11/2011 | Albertson et al. | |
| 8,099,224 B2 | 1/2012 | Tripathi et al. | |
| 8,489,303 B2 | 7/2013 | Phillips | |
| 8,839,766 B2 | 9/2014 | Serrano et al. | |
| 8,869,773 B2 | 10/2014 | Tripathi et al. | |
| 9,020,735 B2 | 4/2015 | Tripathi et al. | |
| 9,086,020 B2 | 7/2015 | Tripathi et al. | |
| 9,341,128 B2 | 5/2016 | Hayman et al. | |
| 9,382,853 B2 | 7/2016 | Phillips et al. | |
| 9,399,964 B2 | 7/2016 | Younkins et al. | |
| 9,422,880 B2 | 8/2016 | Phillips et al. | |
| 9,512,794 B2 | 12/2016 | Serrano et al. | |
| 9,528,446 B2 | 12/2016 | Pirjaberi et al. | |
| 2003/0213467 A1 | 11/2003 | Rayl et al. | |
| 2006/0005811 A1 | 1/2006 | Hartmann | |
| 2006/0130814 A1* | 6/2006 | Bolander | F02D 13/06 123/481 |
| 2007/0243971 A1 | 10/2007 | Brevick | |
| 2008/0066450 A1 | 3/2008 | Surnilla et al. | |
| 2008/0234106 A1* | 9/2008 | Maguire | B60W 30/186 477/169 |
| 2008/0262712 A1 | 10/2008 | Duty et al. | |
| 2008/0288146 A1 | 11/2008 | Beechie et al. | |
| 2009/0239707 A1* | 9/2009 | Albertson | F16H 61/143 477/174 |
| 2010/0050993 A1 | 3/2010 | Zhao et al. | |
| 2011/0288734 A1 | 11/2011 | Phillips et al. | |
| 2013/0289853 A1 | 10/2013 | Serrano | |
| 2013/0291816 A1 | 11/2013 | Serrano et al. | |
| 2014/0041625 A1 | 2/2014 | Pirjaberi et al. | |
| 2014/0041626 A1* | 2/2014 | Wilcutts | F02D 41/00 123/350 |
| 2014/0041641 A1 | 2/2014 | Carlson et al. | |
| 2015/0260117 A1 | 9/2015 | Shost et al. | |
| 2015/0354470 A1 | 12/2015 | Li et al. | |
| 2016/0053697 A1 | 2/2016 | Pirjaberi et al. | |
| 2016/0108834 A1 | 4/2016 | McConville | |
| 2016/0131058 A1 | 5/2016 | Younkins et al. | |

OTHER PUBLICATIONS

International Search Report dated Jul. 3, 2017 from International Application No. PCT/US2017/028121.
Written Opinion dated Jul. 3, 2017 from International Application No. PCT/US2017/028121.
International Search Report dated Jul. 5, 2017 from International Application No. PCT/US2017/028118.
Written Opinion dated Jul. 5, 2017 from International Application No. PCT/US2017/028118.
Nagashima et al., U.S. Appl. No. 15/147,690, filed May 5, 2016.
Pirjaberi et al., U.S. Appl. No. 15/357,398, filed Nov. 21, 2016.
Serrano, U.S. Appl. No. 15/299,259, filed Oct. 20, 2016.
Pirjaberi et al., U.S. Appl. No. 15/646,476, filed Jul. 11, 2017.
Nagashima et al., U.S. Appl. No. 15/697,639, filed Sep. 7, 2017.
Serrano et al., U.S. Appl. No. 15/792,175, filed Oct. 24, 2017.
Pirjaberi et al., U.S. Appl. No. 15/679,419, filed Aug. 17, 2017.

* cited by examiner

COORDINATION OF VEHICLE ACTUATORS DURING FIRING FRACTION TRANSITIONS

CROSS REFERENCE TO RELATED APPLICATIONS

This application claims priority to U.S. Provisional Application No. 62/353,674, filed on Jun. 23, 2016, which is incorporated herein by reference in its entirety.

FIELD OF THE INVENTION

The present invention relates generally to methods and arrangements for controlling vehicle actuators during firing fraction transitions in a skip fire controlled engine.

BACKGROUND

Modern vehicles utilize many actuators, controlling various aspects of vehicle operation. Many of these actuators control engine operation, such as throttle, cam phase, fuel injection, and spark timing. Other actuators control delivery of the engine torque to a vehicle's wheels, such as a torque converter or a transmission. Operation of these actuators must be coordinated to achieve acceptable vehicle performance. In particular it is desirable to control a vehicle to provide optimum fuel efficiency with acceptable NVH (noise, vibration, harshness) performance.

Fuel efficiency of many types of internal combustion engines can be substantially improved by varying the displacement of the engine. This allows for the full torque to be available when required, yet can significantly reduce pumping losses and improve thermodynamic efficiency through the use of a smaller displacement when full torque is not required. The most common method of varying the displacement today is deactivating a group of cylinders substantially simultaneously. In this approach no fuel is delivered to the deactivated cylinders and their associated intake and exhaust valves are kept closed as long as the cylinders remain deactivated.

Another engine control approach that varies the effective displacement of an engine is referred to as "skip fire" engine control. In general, skip fire engine control contemplates selectively skipping the firing of certain cylinders during selected firing opportunities. Thus, a particular cylinder may be fired during one engine cycle and then may be skipped during the next engine cycle and then selectively skipped or fired during the next. Skip fire engine operation is distinguished from conventional variable displacement engine control in which a designated set of cylinders are deactivated substantially simultaneously and remain deactivated as long as the engine remains in the same variable displacement mode. Thus, the sequence of specific cylinders firings will always be exactly the same for each engine cycle during operation in a variable displacement mode (so long as the engine remains in the same displacement mode), whereas that is often not the case during skip fire operation. For example, an 8 cylinder variable displacement engine may deactivate half of the cylinders (i.e. 4 cylinders) so that it is operating using only the remaining 4 cylinders. Commercially available variable displacement engines available today typically support only two or at most three fixed displacement modes.

In general, skip fire engine operation facilitates finer control of the effective engine displacement than is possible using a conventional variable displacement approach. For example, firing every third cylinder in a 4 cylinder engine would provide an effective displacement of $\frac{1}{3}^{rd}$ of the full engine displacement, which is a fractional displacement that is not obtainable by simply deactivating a set of cylinders. Conceptually, virtually any effective displacement can be obtained using skip fire control, although in practice most implementations restrict operation to a set of available firing fractions, sequences or patterns. One of the Applicants, Tula Technology has filed a number of patents describing various approaches to skip fire control.

Many skip fire controllers are arranged to provide a set of available firing patterns, sequences or firing fractions. In some circumstances the set of available firing patterns or fractions will vary as a function of various operating parameters such as engine load, engine speed and transmission gear. Typically the available firing patterns are selected, in part, based on their NVH characteristics. Transitions between firing fraction levels must be managed to avoid unacceptable NVH during the transition. In particular, changes in the firing fraction must be coordinated with other engine actuators to achieve smooth firing fraction transitions.

Many internal combustion engines incorporate a cam phaser to adjust a cam angle or phase relative to the crankshaft. Adjusting the cam phase varies the relative timing of the opening and closing of the intake and/or exhaust valves relative to top dead center (TDC) or some other crankshaft reference point. The cam phase impacts both the cylinder mass air charge (MAC) and the amount of residual exhaust gases left in the cylinder from the preceding cylinder working cycle.

Some engine valve trains utilize a single camshaft to actuate both intake and exhaust valves, while others utilize separate camshafts for the intake and exhaust valves. Still other engines have cylinders arranged in banks with single or dual camshafts dedicated to each bank. When a cam phaser is used in conjunction with a camshaft that actuates both intake and exhaust valves, then cam phase adjustments will affect both the intake and exhaust strokes. When dual camshafts that independently actuate intake and exhaust valves are used, then the intake and exhaust valve timings may be independently varied.

The cam phase can be set to provide optimum fuel efficiency (or other desired characteristics), however the optimal cam phase varies as a function of the engine speed and the cylinder load. Therefore, the fuel efficiency of an engine may generally be improved by varying the cam phase based on the engine operating conditions.

In addition to cam phase there are other actuators and control systems in modern vehicles that impact fuel efficiency and occupant comfort. One such system is control of the torque converter slip. The torque converter transfers motive power between the vehicle's engine and wheels. Torque converter slip indicates the difference in rotational velocity between the input, engine side, of the torque converter and the output, wheel side, of the torque converter. For fuel efficiency it is desirable to minimize or eliminate slip; however, insufficient slip will cause unacceptable NVH and compromise a vehicle's drivability.

There is need for control methods that coordinate changes in the firing fraction with adjustment of other vehicle actuators, such as cam phase and torque converter slip. The present application describes approaches for combining control of various vehicle actuators with skip fire operation to provide fuel efficient transitions between different firing patterns, sequences or firing fractions. In particular, control of cam phasing and torque converter slip are described, but the concepts presented herein are applicable to a broad range of vehicle actuators.

SUMMARY

A variety of methods, controllers and arrangements are described for managing transitions between firing fractions during skip fire or variable displacement operation of an engine. In general, drivetrain slip first transition strategies are described in which increases in the drivetrain slip are changed to, or close to a target drivetrain slip before a corresponding firing fraction change is implemented. When the drivetrain slip change associated with a desired firing fraction change is relatively large, the firing fraction change may be divided into a series of two or more firing fraction change steps. A number of intermediate target selection schemes are described as well.

In one aspect, methods and controllers suitable for managing firing fraction transitions are disclosed. When a request is made to transition to a firing fraction having a higher slip transition threshold than the current operating slip, a transition towards the requested driveline slip is initiated. When appropriate (optionally), one or more intermediate target firing fraction may be identified and the firing fraction transition may be divided into multiple stages. The target firing fraction (i) is selected from a set of available firing fractions capable of delivering a requested engine output, and (ii) has an associated target drivetrain slip transition threshold that is less the slip transition threshold associated with the requested firing fraction. Each firing fraction transition is constrained to only occur when an actual driveline slip is at least as high as the associated drivetrain slip transition threshold.

In some embodiments, when the requested firing fraction is higher than the original firing fraction, the selected target firing fraction is the lowest available firing fraction capable of delivering the requested engine output that has an associated driveline slip transition threshold that is not more than the then current drivetrain slip. This may result in a transitory transition to a target firing fraction that is higher than the requested firing fraction When the requested firing fraction is lower than the first firing fraction, the selected target firing fraction is preferably an intermediate firing fraction between the first and second firing fractions. In some embodiments, the selected target firing fraction is the lowest available firing fraction capable of delivering the requested engine output that has an associated driveline slip transition threshold that is not more than the original slip when such an intermediate firing fraction exists.

In some embodiments, the driveline slip is imparted by a torque converter clutch (TCC).

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

Figure 1:
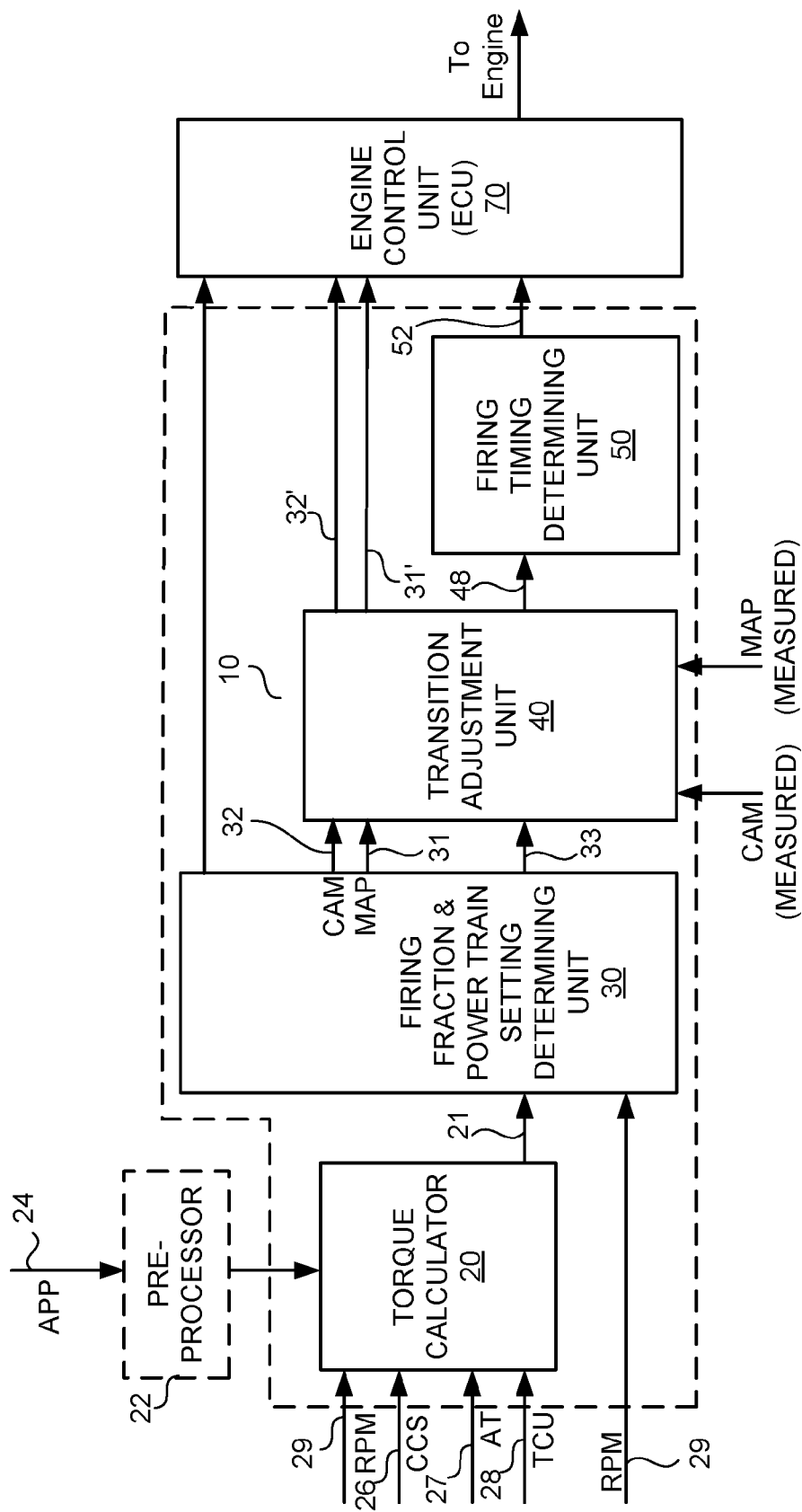
FIG. 1 is a functional block diagram of a skip fire controller having a transition management control unit.

When a transition is made between different firing fractions (or variable displacement states) there is typically a corresponding need or desire to change certain engine or vehicle operating parameters such as air charge, fuel charge, spark timing, drivetrain slip, etc. This is because at any particular firing density, there will be associated operating parameters that are appropriate to most efficiently deliver the desired engine output while maintaining desired performance and passenger comfort standards. Therefore, when a change is made in the firing density, it is typically desirable to concurrently adjust one or more selected engine operating parameters and/or drivetrain characteristics so that the desired engine output and vehicle performance is maintained both throughout the transition and at the new firing fraction. Without such an adjustment, operating at the same engine settings would typically result in the generation of more torque than desired when the firing density is increased, and less torque than desired when the firing density is reduced.

From a control standpoint, the firing density can be changed very quickly by simply altering the selection of the specific cylinders to be fired—however corresponding changes in the air charge tend to be realized more slowly due to the latencies inherent in changing the cam phase, filling or emptying the intake manifold, etc. This is particularly noticeable when the desired firing fraction changes significantly, as for example when transitioning from a firing fraction of 1 to ½ or from ⅔ to ⅓, which requires correspondingly large changes in air charge. Generally, any mismatch between the firing density and the targeted cylinder air charge during a transition, will result in a low frequency torque disturbance (unless otherwise compensated for), which may be perceived as NVH. If the mismatch would result in a torque surge, then the spark timing can be retarded to maintain the desired torque. However, an undesirable side effect of retarding spark to reduce engine output is that retarding spark will generally reduce fuel efficiency. Also, excessive spark retard could lead to misfires further reducing efficiency and potentially adversely affecting the engine performance. Modern engine control often limits the amount of spark retard to ensure proper combustion.

Tula Technology has previously described a variety of techniques for transitioning between different firing fractions. By way of example, various transition control schemes are described in U.S. Pat. Nos. 9,086,020 and 9,086,020) and co-pending application Ser. Nos. 14/857, 371, and 62/296,451 each of which is incorporated herein by reference. Although these and other existing transition schemes work well, there are continuing efforts to provide control schemes and controllers for transitioning between different firing patterns or different firing fractions that work well in a variety of different situations.

In general, it tends to be more fuel efficient to vary (and particularly reduce) the air charge using cam control rather than throttling when possible, since varying the air charge using cam control doesn't have the same level of pumping losses as throttling. The most common example of cam based control of the air charge is the use of a cam phaser to control the phase of the camshaft relative to the crankshaft. However, other types of cam-based control can also be used to control the air charge, such as valve lift, multiple cams, dual cams, etc. when the engine is equipped with appropriate hardware. In engines equipped with cam phase control, some engine control schemes conceptually utilize cam phase as the first mechanism for varying air charge. However a feature (and potential drawback) of cam phase control is that camshaft phase adjustment tends to proceed relatively slowly. For example, conventional cam phasers tend to have slew rates of less than 200 degrees/second and some operate significantly slower than that, as for example, in the vicinity of 50 degrees/second. Since a cam phaser may have the authority to change the cam phase by 50 to 60 degrees, it may take tens of firing opportunities for the cam phaser to realize a large commanded change in cam phase. In some commercial implementations, a worst case cam phase transition time can be on the order of 1.5 seconds. Large cam phase transitions tend to be slow compared to the ability to implement firing fraction changes and compared to other engine control actuators such as spark timing, and throttle control of the intake manifold pressure.

One way to implement a transition from a first operating state (e.g. a first firing fraction at a first cam phase and air charge) to a second/target operating state having a lower firing fraction (e.g., a second/target firing fraction at a second/target cam and air charge) is to first transition the cam phase while using other control actuators such as spark timing and throttle to help ensure that the desired engine torque output is attained through the transition. Then, after the target cam phase has been attained or is within some range of the target cam value, the change in firing fraction can be implemented—again using other control parameters such as spark and throttle to manage the torque output during the transition. This approach can be referred to as a cam first transition approach. Although the cam first transition approach fits nicely with air control schemes that focus on cam phase control to adjust the air charge, it suffers undesirable efficiency losses during many transitions—particularly when the requested cam phase adjustment is relatively large. This is because the average intake manifold pressure during the transition will typically be lower than it would be if the firing fraction were free to transition immediately, increasing pumping losses.

Applicants have determined that the fuel efficiency associated with cam first transition control during reductions in firing fraction can be significantly improved by breaking relatively larger firing fraction transitions into a set of two or more smaller transitions. In this approach, a cam first transition is initially made to an intermediate firing fraction. Once the actual cam phase gets close to, or reaches a target cam phase associated with the intermediate firing fraction, the firing fraction is adjusted to the intermediate firing fraction. A cam first transition is then made to the next intermediate firing fraction or to the final desired firing fraction, as appropriate. The intermediate targets allow the firing fraction to be reduced at intermediate points in the transition, providing a higher average intake manifold pressure which results in improved fuel efficiency during the overall transition. This control strategy is referred to herein as a staged, cam first transition strategy.

Tula Technology has previously described a variety of skip fire controllers. A suitable skip fire controller 10 is functionally illustrated in FIG. 1. The illustrated skip fire controller 10 includes a torque calculator 20, a firing fraction and power train settings determining unit 30, a transition adjustment unit 40, and a firing timing determination unit 50. For the purposes of illustration, skip fire controller 10 is shown separately from powertrain control unit or engine control unit (ECU) 70 which implements the commanded firings and provides the detailed component controls. However, it should be appreciated that in many embodiments the functionality of the skip fire controller 10 may be incorporated into the ECU 70. Indeed incorporation of the skip fire controller into an ECU or power train control unit is expected to be the most common implementation.

The torque calculator 20 is arranged to determine the desired engine torque at any given time based on a number of inputs. The torque calculator outputs a requested torque 21 to the firing fraction and power train settings determining unit 30. The firing fraction and power train settings determining unit 30 is arranged to determine a firing fraction that is suitable for delivering the desired torque based on the current operating conditions and outputs a desired operational firing fraction 33 that is appropriate for delivering the desired torque. Unit 30 also determines selected engine operating settings (e.g., manifold pressure 31, cam timing 32, torque converter slip 35, etc.) that are appropriate to deliver the desired torque at the designated firing fraction.

In many implementations, the firing fraction and engine and power train settings determining unit selects between a set of predefined firing fractions which are determined to have relatively good NVH characteristics. In such embodiments, there are periodically transitions between desired operational firing fractions. It has been observed that transitions between operational firing fractions can be a source of undesirable NVH. Transition adjustment unit 40 is arranged to adjust the commanded firing fraction and certain engine settings (e.g., camshaft phase, throttle plate position, intake manifold pressure, torque converter slip) during transitions in a manner that helps mitigate some of the transition associated NVH.

The firing timing determining unit 50 is responsible for determining the specific timing of firings to deliver the desired firing fraction. The firing sequence can be determined using any suitable approach. In some preferred implementations, the firing decisions are made dynamically on an individual firing opportunity by firing opportunity basis, which allows desired changes to be implemented very quickly. A variety of firing timing determining units that are well suited for determining appropriate firing sequences based on a potentially time varying requested firing fraction or engine output have been previously described by Tula. Many such firing timing determining units are based on a sigma delta converter, which is well suited for making firing decisions on a firing opportunity by firing opportunity basis. In other implementations, pattern generators or predefined patterns may be used to facilitate delivery of the desired firing fraction.

The torque calculator 20 receives a number of inputs that may influence or dictate the desired engine torque at any time. In automotive applications, one of the primary inputs to the torque calculator is the accelerator pedal position (APP) signal 24 which indicates the position of the accelerator pedal. In some implementations the accelerator pedal position signal is received directly from an accelerator pedal position sensor (not shown) while in others an optional preprocessor 22 may modify the accelerator pedal signal prior to delivery to the skip fire controller 10. Other primary inputs may come from other functional blocks such as a cruise controller (CCS command 26), the transmission controller (AT command 27), a traction control unit (TCU command 28), etc. There are also a number of factors such as engine speed that may influence the torque calculation. When such factors are utilized in the torque calculations, the appropriate inputs, such as engine speed (RPM signal 29) are also provided or are obtainable by the torque calculator as necessary.

Further, in some embodiments, it may be desirable to account for energy/torque losses in the drive train and/or the energy/torque required to drive engine accessories, such as the air conditioner, alternator/generator, power steering pump, water pumps, vacuum pumps and/or any combination of these and other components. In such embodiments, the torque calculator may be arranged to either calculate such values or to receive an indication of the associated losses so that they can be appropriately considered during the desired torque calculation.

The nature of the torque calculation will vary with the operational state of the vehicle. For example, during normal operation, the desired torque may be based primarily on the driver's input, which may be reflected by the accelerator pedal position signal 24. When operating under cruise control, the desired torque may be based primarily on the input from a cruise controller. When a transmission shift is imminent, a transmission shifting torque calculation may be used to determine the desired torque during the shifting operation. When a traction controller or the like indicates a potential loss of traction event, a traction control algorithm may be used to determine the desired torque as appropriate to handle the event. In some circumstances, depression of a brake pedal may invoke specific engine torque control. When other events occur that require measured control of the engine output, appropriate control algorithms or logic may be used to determine the desired torque throughout such events. In any of these situations, the required torque determinations may be made in any manner deemed appropriate for the particular situation. For example, the appropriate torque determinations may be made algorithmically, using lookup tables based on current operating parameters, using appropriate logic, using set values, using stored profiles, using any combinations of the foregoing and/or using any other suitable approach. The torque calculations for specific applications may be made by the torque calculator itself, or may be made by other components (within or outside the ECU) and simply reported to the torque calculator for implementation.

The firing fraction and power train settings determining unit 30 receives requested torque signal 21 from the torque calculator 20 and other inputs such as engine speed 29 and various power train operating parameters and/or environmental conditions that are useful in determining an appropriate operational firing fraction 33 to deliver the requested torque under the current conditions. Power train parameters include, but are not limited to, throttle position, cam phase angle, fuel injection timing, spark timing, torque converter slip, transmission gear, etc. The firing fraction is indicative of the fraction or percentage of firings that are to be used to deliver the desired output. In some embodiments the firing fraction may be considered as an analog input into a sigma-delta converter. Often, the firing fraction determining unit will be constrained to a limited set of available firing fractions, patterns or sequences that have been selected based at least in part on their relatively more desirable NVH characteristics (collectively sometimes referred to herein generically as the set of available firing fractions). There are a number of factors that may influence the set of available firing fractions. These typically include the requested torque, cylinder load, engine speed (e.g. RPM), vehicle speed and current transmission gear. They may potentially also include various environmental conditions such as ambient pressure or temperature and/or other selected power train parameters. The firing fraction determining aspect of unit 30 is arranged to select the desired operational firing fraction 33 based on such factors and/or any other factors that the skip fire controller designer may consider important. By way of example, a few suitable firing fraction determining units are described in application Ser. Nos. 13/654,244; 13/654,248, 13/963,686, 14/638,908, and 62/296,451, each of which are incorporated herein by reference.

The number of available firing fractions/patterns and the operating conditions during which they may be used may be widely varied based on various design goals and NVH considerations. In one particular example, the firing fraction determining unit may be arranged to limit available firing fractions to a set of 29 possible operational firing fractions—each of which is a fraction having a denominator of 9 or less—i.e., 0, $\frac{1}{9}$, $\frac{1}{8}$, $\frac{1}{7}$, $\frac{1}{6}$, $\frac{1}{5}$, $\frac{2}{9}$, $\frac{1}{4}$, $\frac{2}{7}$, $\frac{1}{3}$, $\frac{3}{8}$, $\frac{2}{5}$, $\frac{3}{7}$, $\frac{4}{9}$, $\frac{1}{2}$, $\frac{5}{9}$, $\frac{4}{7}$, $\frac{3}{5}$, $\frac{5}{8}$, $\frac{2}{3}$, $\frac{5}{7}$, $\frac{3}{4}$, $\frac{7}{9}$, $\frac{4}{5}$, $\frac{5}{6}$, $\frac{6}{7}$, $\frac{7}{8}$, $\frac{8}{9}$ and 1. However, at certain (indeed most) operation conditions, the set of available firing fraction may be reduced and sometimes the available set is greatly reduced. In general, the set of available firing fractions tends to be smaller in lower gears and at lower engine speeds. For example, there may be operating ranges (e.g. near idle and/or in first gear) where the set of available firing fractions is limited to just two available fractions—(e.g., $\frac{1}{2}$ or 1) or to just 4 possible firing fractions—e.g., $\frac{1}{3}$, $\frac{1}{2}$, $\frac{2}{3}$ and 1. Of course, in other embodiments, the permissible firing fractions/patterns for different operating conditions may be widely varied.

When the available set of firing fractions is limited, various power train operating parameters such as mass air charge (MAC) and/or spark timing will typically need to be varied to ensure that the actual engine output matches the desired output. In the embodiment illustrated in FIG. 1, this functionality is incorporated into the power train settings component of unit 30. In other embodiments, it can be implemented in the form of a power train parameter adjusting module (not shown) that cooperates with a firing fraction calculator. Either way, the power train settings component of unit 30 or the power train parameter adjusting module determines selected power train parameters that are appropriate to ensure that the actual engine output substantially equals the requested engine output at the commanded firing fraction and that the wheels receive the desired brake torque. Torque converter slip may be included in the determination of appropriate power train parameters, since increasing the torque converter slip will generally decrease the perceived NVH. Depending on the nature of the engine, the air charge can be controlled in a number of ways. Most commonly, the air charge is controlled by controlling the intake manifold pressure and/or the cam phase (when the engine has a cam phaser or other mechanism for controlling valve timing). However, when available, other mechanism such as adjustable valve lifters, air pressure boosting devices like turbochargers or superchargers, air dilution mechanism such as exhaust gas recirculation or other mechanisms can also be used to help adjust the air charge. In the illustrated embodiment, the desired air charge is indicated in terms of a desired intake manifold pressure (MAP) 31 and a desired cam phase setting 32. Of course, when other components are used to help regulate air charge, there may be indicated values for those components as well.

The firing timing determining module 50 is arranged to issue a sequence of firing commands 52 that cause the engine to deliver the percentage of firings dictated by a commanded firing fraction 48. The firing timing determining module 50 may take a wide variety of different forms. By way of example, sigma delta convertors work well as the firing timing determining module 50. A number of Tula's patents and patent applications describe various suitable firing timing determining modules, including a wide variety of different sigma delta based converters that work well as the firing timing determining module. See, e.g., U.S. Pat. Nos. 7,577,511, 7,849,835, 7,886,715, 7,954,474, 8,099, 224, 8,131,445, 8,131,447, 8,839,766 and 9,200,587. The sequence of firing commands (sometimes referred to as a drive pulse signal 52) outputted by the firing timing determining module 50 may be passed to an engine control unit (ECU) 70 or another module such as a combustion controller (not shown in FIG. 1) which orchestrates the actual firings. A significant advantage of using a sigma delta converter or an analogous structure is that it inherently includes an accumulator function that tracks the portion of a firing that has been requested, but not yet delivered. Such an arrangement helps smooth transitions by accounting for the effects of previous fire/no fire decisions.

When a change in firing fraction is commanded by unit 30, it will often (indeed typically) be desirable to simultaneously command a change in the cylinder mass air charge (MAC). As discussed above changes in the air charge tend to be realized more slowly than changes in firing fraction can be implemented due to the latencies inherent in filling or emptying the intake manifold and/or adjusting the cam phase. Transition adjustment unit 40 is arranged to adjust the commanded firing fraction as well as various operational parameters such as commanded cam phase and commanded manifold pressure during transitions in a manner that mitigates unintended torque surges or dips during the transition. That is, the transition adjustment unit manages at least the target cam phase, one or more other actuators that impact the air charge (e.g. throttle position), and the firing fractions during transitions between commanded firing fractions. It may also control other power train parameters, such as torque converter slip.

Figure 2A:
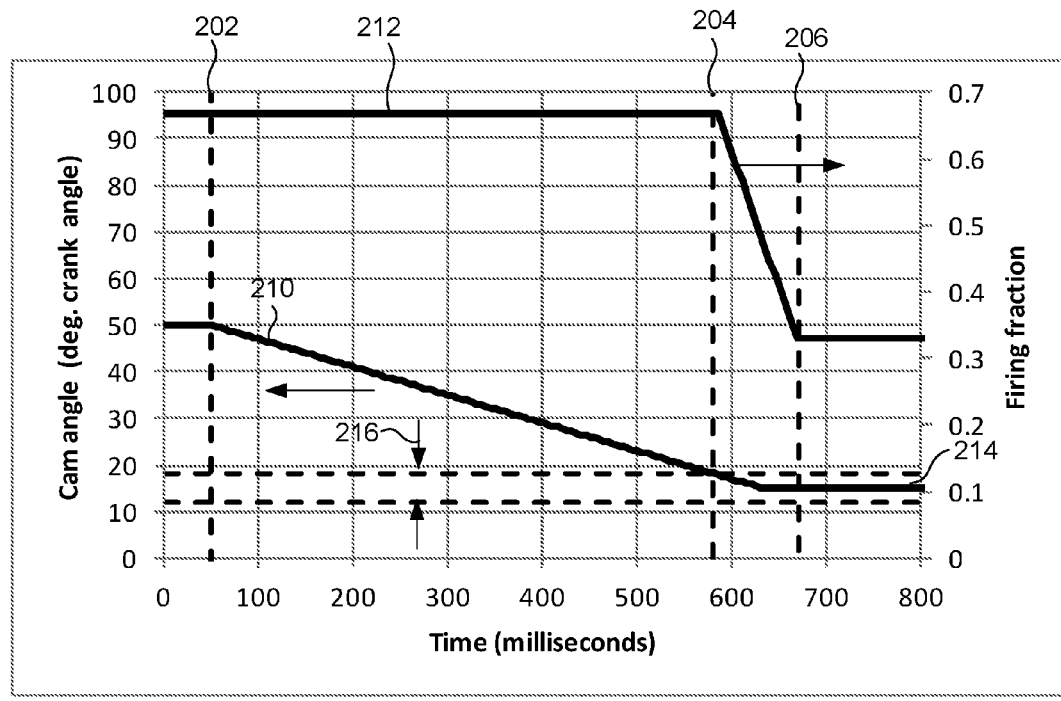
FIG. 2A illustrates a timing diagram for an exemplary cam first transition control method.
Figure 2B:
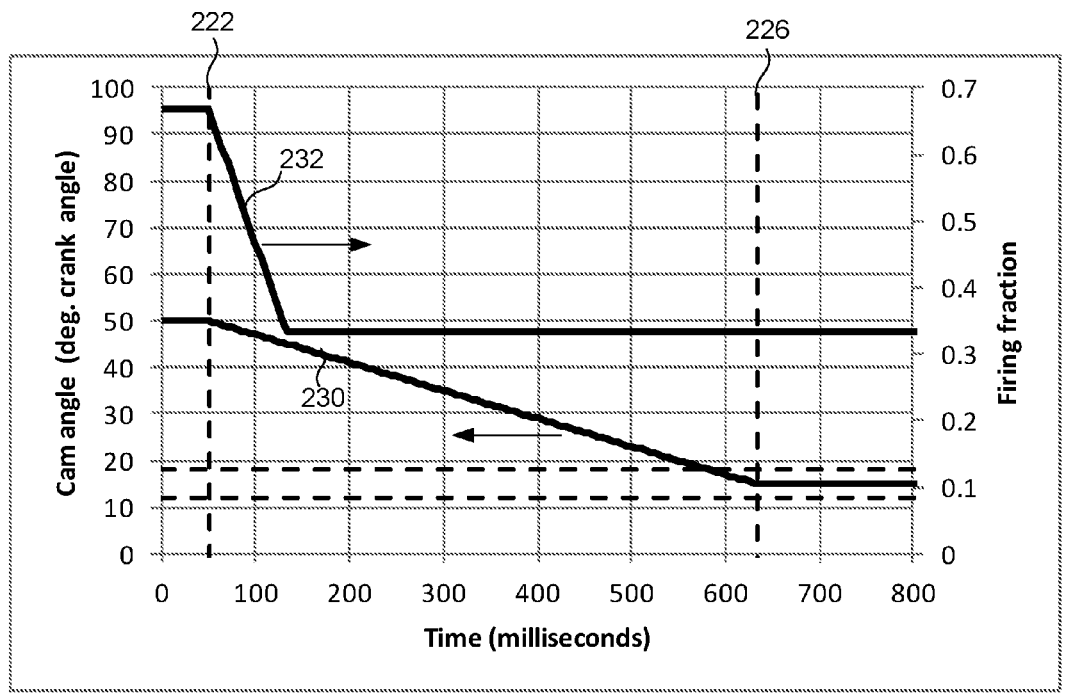
FIG. 2B illustrates a timing diagram for an exemplary concurrent transition control method.
Figure 2C:
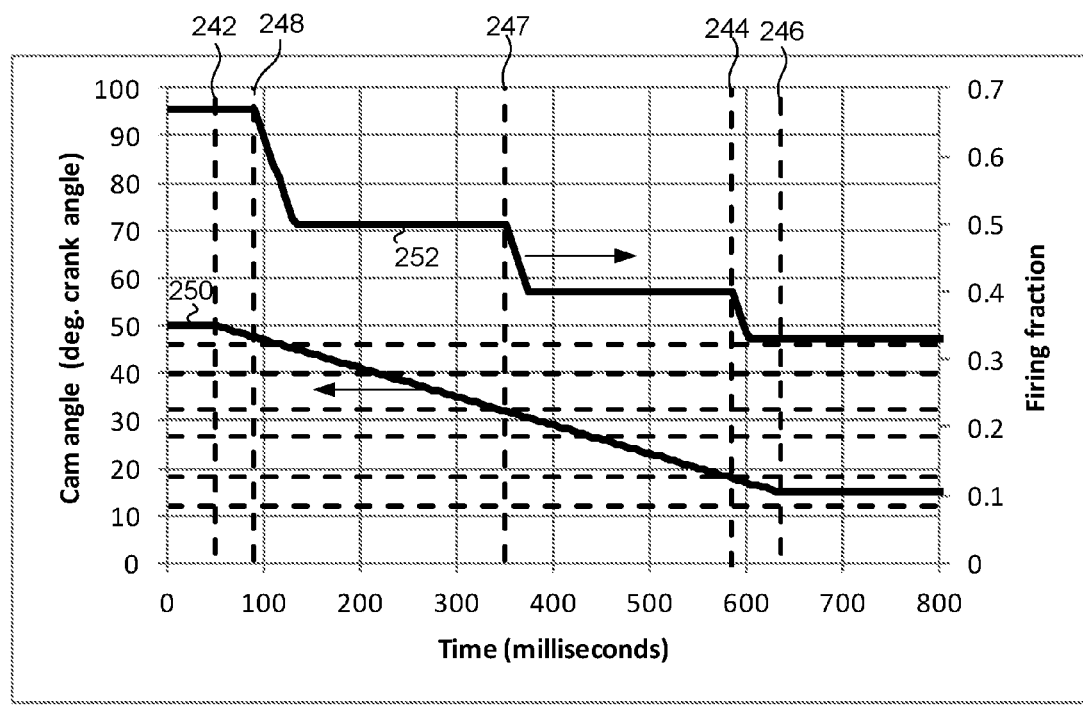
FIG. 2C illustrates a timing diagram for an exemplary cam first transition strategy using intermediate firing fractions.

FIGS. 2A, 2B, and 2C are exemplary timing diagrams depicting various transition control strategies. All cases assume that the transition should maintain a constant torque output through the transition, although this is not a requirement. For the purposes of illustration, all cases further assume a constant maximum cam slew rate of 60°/sec and a linear firing fraction slew rate of 0.004/msec. The initial and final firing fraction are ⅔ and ⅓ in all cases and the initial and final cam phase angles are 50° and 15° in all cases. The cam phase angle transition threshold is ±3 degrees of crankshaft rotation angle for all firing fraction levels. The cam angle ranges are depicted by dashed horizontal lines in all FIGS. 2A, 2B, and 2C.

FIG. 2A illustrates an exemplary transition that utilizes a cam first transition approach. Changes in the cam phase angle 210 and the firing fraction 212 are depicted as a function of time. The transition begins at 50 msec, denoted by line 202. When a command to change firing fraction is received, the cam phase angle 210 begins to change at its maximum slew rate, in this example 60°/sec. The firing fraction 212 remains fixed at its initial value until the cam phase angle reaches or is within a defined range of its final target value. In this example, the final cam phase target 214 is 15° and the range 216 is within ±3° of the final cam phase. The cam phase angle 210 reaches the defined range of its target value at approximately 580 msec, denoted by line 204. The firing fraction 212 then begins to transition towards its target value, in this example ⅓. The firing fraction slew rate in this example is 0.004/msec. If the engine is an 8 cylinder engine operating at 1500 this corresponds to a slew rate of 0.04 per firing opportunity. The change in the firing fraction may be linear as described in co-pending application Ser. No. 14/857,371; however, this is not a requirement. It should be appreciated that the firing fraction slew rate can be chosen based on providing acceptable NVH performance during the transition and other concerns. The transition ends when the firing fraction reaches its final target value at about 670 msec, denoted by line 206. The entire transition length, the period between line 202 and 206, is approximately 620 msec, during most of which time the cam phase is in motion. Also during most or all of the transition time the firing fraction is higher than required to generate requested torque. Typically, the air charge would be managed throughout the transition to maintain the desired cylinder torque output. This could be accomplished by reducing the MAP or MAF using any available actuator(s) such as throttle position. However, when necessary spark timing retard can be used as well. As will be appreciated by those familiar with the art, both throttling and spark retard tend to reduce fuel efficiency.

FIG. 2B illustrates another method of implementing a firing fraction transition. The figure depicts changes in the cam phase angle 230 and the firing fraction 232 as a function of time. Unlike the cam first control method depicted in FIG. 2A, the firing fraction and cam phase angle begin their transition relatively contemporaneously once a transition is initiated at time 222, 50 msec. The firing fraction 232 reaches its final target relatively quickly, while the cam phase 230 continues at its maximum slew rate until it reaches its final target value at time 226, approximately 635 msec. In this case, the total transition length is 585 msec, only slightly shorter than the case described relative to FIG. 2A; however, the firing fraction is near its final target value for much of that time. Again cylinder air charge (and, if necessary, spark retard) would preferably be controlled in an appropriate manner to ensure that the desired torque is provided throughout the transition. This type of control is generally more fuel efficient, since MAP can be higher and/or spark more advanced than in the case described relative to FIG. 2A. The duration of the transition in the firing fraction is identical, since identical slew rates were chosen for the two cases.

FIG. 2C illustrates an exemplary transition that utilizes a staged, cam first transition approach. The figure depicts the changes in the cam phase angle 250 and the firing fraction 252 as a function of time. The transition begins at 50 msec, denoted by line 242. Immediately update a command to change firing fraction the cam phase angle 250 begins to change at its maximum slew rate, again in this example 60°/sec. The cam phase angle changes at this maximum slew rate throughout the entire transition until it reaches its final value of 15°. The firing fraction 242 remains fixed at its initial value until the cam phase angle reaches a defined range about a first intermediate cam target value, occurring at about 90 msec denoted by line 248. In this example, the first intermediate target value is a cam phase angle of 43° associated with the first intermediate target firing fraction of ½. The firing fraction then transitions to and remains at this level until the cam phase is within the target range of the next intermediate or final cam target. In this example, the next intermediate cam target is 29.5° associated with an intermediate firing fraction of ⅖ (see Table 1). The cam phase is within a range of this target value at 350 msec, denoted by line 247. At this time, the firing fraction begins a transition to the next intermediated firing fraction level of ⅖. Once there the firing fraction 252 remains fixed until the cam phase angle 250 reaches the defined range of its final target value at approximately 580 msec, denoted by line 244. The firing fraction 252 then begins to transition towards its final target value, in this example ⅓. The firing fraction slew rate in all transition steps is 0.004/msec, the same as in the previous two examples. It should be appreciated that the firing slew may not be linear and may have a different form and rate between all the firing fraction levels of the transition. The transition ends when the firing fraction reaches its final target value at about 635 msec, denoted by line 246. The entire transition length, the period between line 242 and 246 is approximately 585 msec, the same as the transition length depicted in FIG. 2B.

Figure 3:
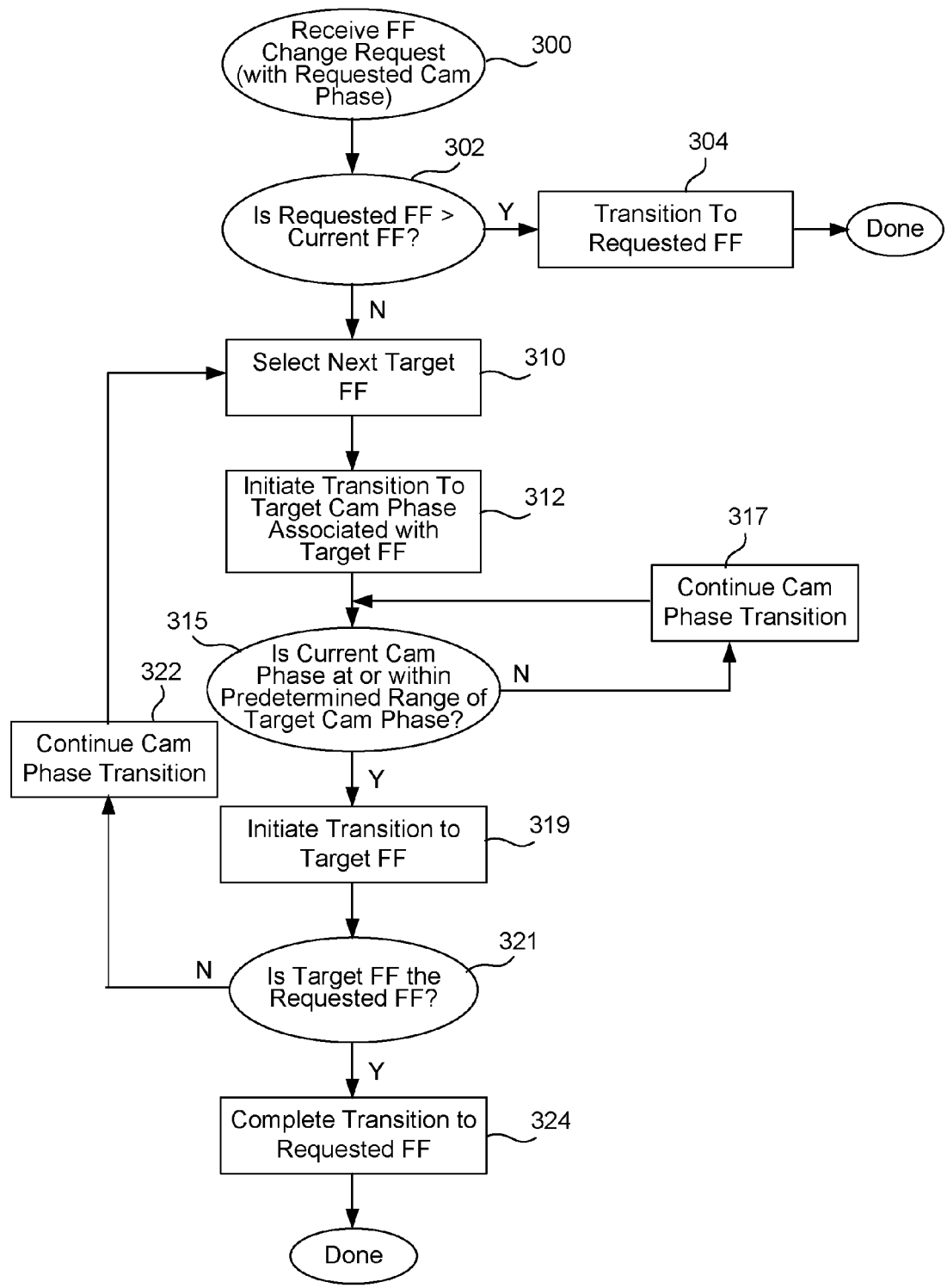
FIG. 3 is a flow chart illustrating a cam first firing fraction transition management scheme in accordance with a nonexclusive embodiment.
Figure 4:
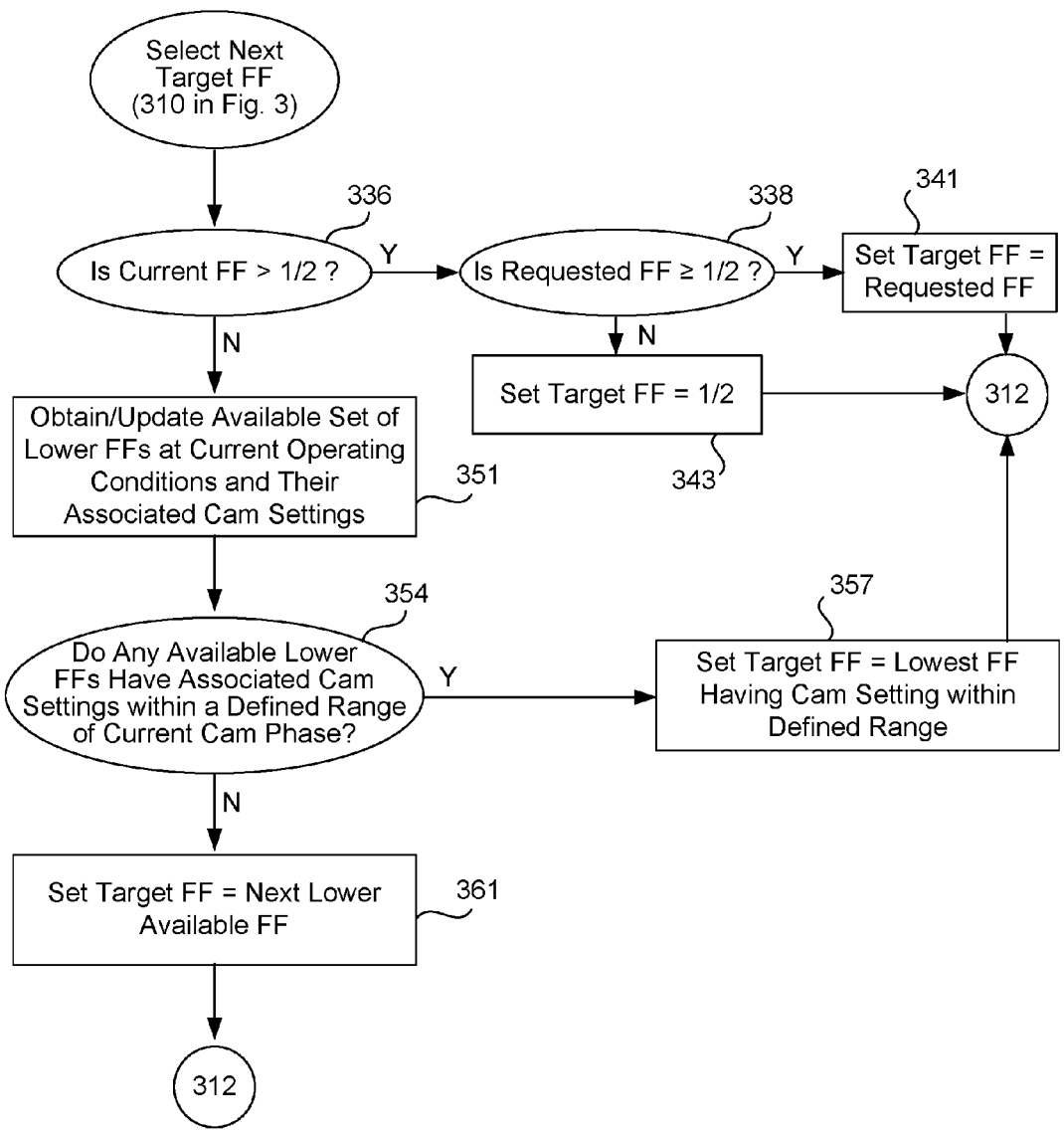
FIG. 4 is a flow chart illustrating a method of selecting a next target firing fraction in accordance with a nonexclusive embodiment.

Referring next to FIGS. 3 and 4, several cam first control approaches in accordance with various nonexclusive embodiments will be described. In the illustrated embodiment, the skip fire controller 10 (and more particularly transition adjustment unit 40) manages firing fraction changes differently based on whether the request seeks to increase or decrease the firing fraction. This distinction is represented by step 302 in the flow chart of FIG. 3. When the change request seeks to increase the firing fraction, more torque is typically being requested so the transition to the new firing fraction begins substantially immediately as represented by step 304 to help ensure that the requested torque can be delivered as quickly as possible. That is, the controller does not wait for the newly requested cam position to be attained before initiating the transition to a higher firing fraction. Nevertheless, the transition to a higher firing fraction is typically implemented gradually over a short period of time in an effort to mitigate vibration inducing torque fluctuations due to cam transition and manifold filling/emptying dynamics as described, for example, in the previously incorporated U.S. Pat. Nos. 9,086,020 and 9,086, 020 and co-pending application Ser. Nos. 14/857,371, and 62/296,451. This is generally analogous to the approach illustrated above with respect to FIG. 2B.

When the change request seeks to lower the firing fraction, a cam first transition scheme may be employed. In this circumstance the controller 10 (e.g., firing fraction & power train setting determining unit 30) selects a target firing fraction 33 (step 310) which in some instances will be an intermediate firing fraction that is between the current firing fraction and the requested firing fraction. The new target firing fraction may be the largest of the available firing fractions between the current and final firing fraction, although this is not a requirement. The use of intermediate target firing fractions is particularly useful when relatively larger firing fraction changes are requested. Various methods of determining when and what values to select as the intermediate firing fraction are described in more detail below with respect to FIG. 4.

After the (potentially intermediate) target firing fraction has been determined, the controller initiates a transition to a target cam phase associated with the target firing fraction in step 312. This cam phase angle transition continues until the cam phase reaches—or is within a predetermined range of the target cam phase as represented by flow chart steps 315 and 317. Once the cam phase has reached (or is close to) the target cam phase, a transition to the target firing fraction is initiated in step 319. A variety of firing fraction transition strategies may be employed to minimize torques sags and/or surges during the firing fraction transition such as those described in the incorporated transition management patents—although again, the throttle plate position would typically be a primary mechanism used to manage air charge through the firing fraction change. In some implementations, the transition to the target cam firing fraction is completed before the transition to the target firing fraction is initiated. In others, the transition to the target firing fraction begins when the actual cam phase approaches within a designated range of the target cam phase.

During the cam phase transition segment of the transition, the firing fraction is often held constant. Therefore, absent correction, the air charge (and corresponding fuel charge) would change (typically increase) during the cam phase transition thereby resulting in an undesirable torque surge. To avoid that problem the engine air charge is preferably held substantially constant through the cam phase transition by modulating other parameters that affect air charge—e.g., the throttle position or other actuators that impact the intake manifold pressure or the mass air flow (MAF). To the extent that it is not possible to maintain a substantially constant engine air charge, other operating parameters (such as spark timing) can be modulated during the cam phase transition to help avoid or minimize torque surges and/or sags throughout the transition. Here the term "substantially constant" does not limit engine air charge changes that might be necessary to compensate for changes in engine efficiency and requested torque that may occur through the transition. In particular, the engine efficiency generally changes with firing fraction, which results in the total engine air charge or mass air flow (MAF) changing to generate the same torque. Therefore, over the course of the cam phase transition, the transition adjustment unit instructs the CPU to modify certain operating parameters (e.g. manifold pressure, spark timing etc.) in a manner that maintains the engine's torque output smooth through the transition. In FIG. 1, this is represented by requested manifold pressure signal 31' which may be modified relative to the manifold pressure 31 requested by power train setting determining unit 30 during transitions.

After the cam phase transition has been completed (or is nearing completion), the transition from the previous firing fraction to the target firing fraction begins. Again, it is desirable to maintain a smooth torque output throughout the firing fraction transition segment of the transition. Since changes in commanded air charge are realized more slowly than changes in firing fraction can be implemented, it is generally preferable to gradually adjust the firing fraction in a manner that corresponds to the change in air charge during this segment of the transition as described in several of the incorporated firing fraction transition management patents. Again, other variable engine parameters such as spark timing can also be used as necessary to maintain smooth torque output throughout the transition.

In the discussion above, it is pointed out that the firing fraction transition may optionally begin as the cam phase approaches the target cam phase rather than always waiting for the target cam phase to be achieved. This is because relatively smaller changes in cam position have a relatively moderate impact on air charge. Accordingly, the overall transition can be sped up by initiating the firing fraction change before the target cam phase is actually reached.

In various preferred embodiments, during the firing fraction change, the cam phase preferably continues to transition along the same transition path towards the requested cam phase until the requested cam phase is reached. That is, the cam phase transition is not paused during the firing fraction transitions. However, if desired for control purposes or otherwise, the cam phase may be held constant, or relatively constant, during the firing fraction transition with other variables such as throttle position, manifold pressure, etc. being used as the primary mechanism to vary the air charge as required during the firing fraction transition portion(s) of the overall transition. In embodiments that begin the firing fraction transition before the target cam phase is actually reached, the actual cam phase range within which the firing fraction change is initiated may vary with the needs of any particular application. However, by way of example, it has been found that initiating the firing fraction change when the actual cam phase is within approximately one to four degrees (1° to 4°) of the target cam phase (which correlates to 2° to 8° of crankshaft rotation in a four stroke engine) works well from a control standpoint.

Returning to the flow chart of FIG. 3, if the target firing fraction is the requested firing fraction, the transition to the requested firing fraction continues as represented by step 324 until the transition is completed. In some cases, the cam angle may need to continue to move towards its final target value in this block. In other cases, the final cam target may be reached prior to attainment of the final target firing fraction. If the target firing fraction was an intermediate firing fraction, then the logic returns to step 310 where the same, cam first logic flow is then repeated until the requested firing fraction and air charge/cam position are achieved.

Since the transition described above takes some time to complete, in practice, the desired engine output (the requested engine torque), will sometimes (indeed often) vary to some extent due to changing driving conditions or other factors. If the change in requested torque is significant enough, it may trigger a change in the requested firing fraction during the course of a transition. The described process handles any such changes quite well. If the requested firing fraction changes to a value that is higher than the then current firing fraction, the skip fire controller 10 can begin transitioning to the new—higher—firing fraction as soon as practical as represented by step 302 in the flow chart. However, it should be appreciated that there is no need to wait until the then target firing fraction is attained before initiating a transition to a higher firing fraction. Rather, firing fraction increase requests can be treated as an interrupt that immediately transitions the firing fraction control out of the flow illustrated in FIG. 3 to the immediate firing fraction increase transition logic represented by step 304.

If the requested firing fraction changes to a value that is lower than the then current firing fraction, the process illustrated in FIG. 3 can readily handle such change(s) using the same algorithm, simply substituting in the new value of the requested firing fraction regardless of whether it is higher or lower than the old requested value.

During normal skip fire operation, when a change in requested torque occurs that is not large enough to trigger a change in firing fraction, the change in torque is typically met by changing the requested air charge. This air charge change can be provided by changing the throttle blade position in concert with changes in cam phase angle. Generally the throttle and cam may be adjusted to positions delivering maximum fuel efficiency. If necessary, spark timing may be adjusted appropriately as well to help match the delivered with the requested torque. In some situation where the torque request changes during a firing fraction transition, a new cam target may be set. Such changes can also readily be handled by the described process by simply using the "new" requested cam phase as the requested cam phase.

There are a number of different processes that may be used to select the target firing fraction (step 310) for any iteration. One suitable method will be described next with reference to FIG. 4. As will be apparent from the following discussion, the method described with respect to FIG. 4 incorporates a number of conceptual approaches that may be utilized together or independently and/or in a variety of different combinations.

In the method of FIG. 4, the logic first determines whether the current firing fraction exceeds a predetermined threshold—which in the illustrated embodiment is one-half (step 336). If so, and the requested firing fraction is greater than or equal to the predetermined threshold (again ½ in the example), the target firing fraction is set to the requested firing fraction and a cam first transition approach is made directly to the requested firing fraction (following the flow 338, 341, 312). Alternatively, if the current firing fraction exceeds the predetermined threshold and the requested firing fraction is less than the predetermined threshold, then the target firing fraction is set to that threshold (e.g., ½). Again a cam first transition strategy may be followed to transition from the original firing fraction to the intermediate target firing fraction of ½ (338, 343, 319). For many engines, a firing fraction of ½ is known to be a particularly smooth running firing fraction, and empirical evidence has shown that for some engines, stepping first to an intermediate firing fraction of ½ can work well when relatively larger transitions that span the ½ threshold are requested. Of course, different thresholds can be used when appropriate for specific engines.

When the determination in step 336 is that the current firing fraction is less than or equal to the predetermined threshold, the logic flows to step 351 where the controller obtains (or updates) a set of available firing fractions. The set of available firing fractions is a set of firing fractions that are deemed suitable for use to deliver the desired engine output based on criteria designated by the engine controller designer. Typically, that would be the set of firing fractions that are capable of delivering the desired torque while still meeting desired NVH constraints. Briefly, if the desired torque can be delivered by operating ⅓ of the cylinders, then conceptually, any firing fraction at or above ⅓ is capable of delivering the desired engine output. However, some of these firing fractions may be undesirable for use at the current operating conditions (e.g., engine speed, gear, vehicle speed, etc.) due to NVH or other concerns. Thus, not all of the firing fractions that are capable of delivering the desired torque may be deemed appropriate/available for use at any particular time. In one example, achieving acceptable NVH tends to be more challenging at lower engine speeds than higher engine speeds and at higher cylinder loads than at lower cylinder loads. Therefore, a particular firing fraction may be suitable for use when the engine speed is higher and the cylinder load is lower, but not appropriate at lower engine speeds with a higher cylinder load. The set of available firing fractions may be determined using lookup tables, algorithmically or using any other suitable approach. By way of example, a few ways of determining available firing fractions are described in U.S. Pat. Nos. 9,086,020 and 9,200,575 as well as U.S. patent application Ser. Nos. 13/654,248, 13/963,686, 14/638,908 and 14/919,011, each of which is incorporated herein by reference.

For each of the currently available firing fractions, the cam phase setting that would be appropriate for use at that firing fraction is determined as part of step 351. The appropriate cam phases can be determined using any appropriate approach. By way of example, lookup tables and/or various algorithmic or air model based approaches can be used to readily determine the appropriate cam phase settings for each available firing fraction and cylinder load. The cam phase setting may correspond to that which yields the most fuel efficient operation at the desired engine speed and cylinder load.

One way to pick the next target firing fraction is to look for the smallest lower available firing fraction that has an associated cam setting within a predetermined range of the current cam position (or the current target cam position). Step 354. The available firing fractions are based at least in part on their NVH characteristics as previously described. The actual allowed range of cam settings that is appropriate will vary based on a variety of factors, including cam phaser responsiveness, emissions control, engine responsiveness, combustion stability, efficiency, design goals, etc. When desired, the acceptable range may also vary as a function of current operating conditions, as for example, engine speed, gear, road roughness, etc. By way of example, thresholds on the order of 2 to 8 degrees of camshaft rotation—as for example 6 degrees of camshaft rotation may be appropriate in some embodiments. In such an implementation, the logic would look for the lowest firing fraction having an associated desired cam phase that is within the designated range (e.g. six degrees) of the cam phase associated with the current cam phase (or current target cam phase) and (if any such firing fractions exist) that firing fraction is selected as the new target firing fraction as represented by flow chart step 357. If none of the lower available firing fractions are within the prescribed range, then the new target firing fraction is set to be the next lowest available firing fraction in step 361.

To further illustrate the staged, cam first transition strategy described above with respect to FIGS. 3 and 4, consider a request to change the firing fraction from ⅔ to ⅓ (similar to the example shown in FIG. 2C) using a controller constrained to operate at firing fractions having a denominator of nine or less. In such a circumstance, any of intermediate firing fractions ⅜, ⅔, 3/7, 4/9, ½, 5/9, 4/7, ⅗, ⅝ would potentially be able to deliver the desired torque, although some may be excluded from the available set due to NVH issues. In such an example, the set of potentially available firing fractions between the original and requested firing fractions (inclusive), and their associated desired cam phases at some engine speed and torque might look like Table 1.

TABLE 1

| Firing Fraction | Cam Advance (in crankshaft degrees) |
|---|---|
| ⅔ | 50° |
| ⅝ | 49.5° |
| ⅗ | 48.5° |
| 4/7 | 47.9° |
| 5/9 | 46.9° |
| ½ | 43° |
| 4/9 | 36.5° |
| 3/7 | 34.3° |
| ⅖ | 29.5° |

TABLE 1-continued

| Firing Fraction | Cam Advance (in crankshaft degrees) |
|---|---|
| ⅜ | 24.6° |
| ⅓ | 15° |

As discussed above, not all of the intermediate firing fractions will be deemed suitable for use all of the time. Therefore for the purposes of explanation, consider a circumstance in which the set of available firing fractions include 1, ⅘, ⅔, ⅗, ½. ⅖ and ⅓. In that scenario, the intermediate firing fractions ⅜, 3/7, 4/9, 5/9, 4/7, ⅗, ⅝ are excluded for NVH or some other reason. In this example, the ultimately desired cam advance is 15° (i.e., the cam advance associated with the requested ⅓ firing fraction).

Since the original firing fraction was ⅔ and the requested firing fraction is ⅓, the first intermediate target firing fraction would be ½ following steps 336, 338 and 343 of FIG. 4. The ½ target firing fraction has a corresponding cam advance of 43°. Thus, following a cam first transition strategy, the camshaft begins transitioning towards the requested cam advance while maintaining the firing fraction at ⅔. Once the actual cam advance gets within a designated range of 43° (e.g., within 3 degrees), a transition to the target ½ firing fraction is made and the next target firing fraction is determined. As discussed above, the cam phase preferably continues to transition towards the ultimately desired cam advance of 15° during this intermediate firing fraction transition, although that is not a requirement.

At this stage the only two lower firing fractions that are "available" are ⅖ and ⅓. Since, neither of these firing fraction have an associated cam phase within a designated range of the current cam phase, the next intermediate firing fraction would be set to the next lower available firing fraction (step 361), which in the example is ⅖, which has an associated target cam phase of 29.5°. Using the cam first transition approach, the firing fraction is held at ½ until the actual cam phase comes within the designated range of the new target cam phase at which point a transition to the ⅖ firing fraction is initiated. In the example, this transition may be initiated at about 32.5°. As discussed above, the cam phase preferably continues to transition towards the ultimately desired cam advance of 15° during this intermediate firing fraction transition, although that is not a requirement.

Repeating the same target selection process, the next target firing fraction would be the requested firing fraction of ⅓ since it is the next lowest firing fraction. Continuing to use the cam first transition approach, the firing fraction is held at ⅖ until the actual cam phase comes within the designated range of the new target cam phase at which point a transition to the ⅓ firing fraction is initiated. In the example, this transition may be initiated at about 18°. Since ⅓ is the requested firing fraction, the cam transition continues to the desired cam advance of 15°.

In the embodiment illustrated in FIG. 4, three different approaches to selecting intermediate target firing fractions are described. Any of these approaches can be used independent of the others and/or in combination with any other defined intermediate target selection schemes. Thus, for example, an alternate intermediate target selection scheme could always transition to the next lower available firing fraction which would effectively amount to using illustrated step 361 alone as the next target firing fraction selection criteria. If such an approach was used in the example set forth above, the intermediate targets would sequentially include ⅗, ½. ⅖ and ⅓ if those were the only available intermediate fractions. In other embodiments, the transition selection logic could begin at step 351 with the next target selection being determined based on the lowest firing fraction having an associated cam phase within a defined range of a current cam phase/target cam phase. Of course a wide variety of other target selection strategies may be employed in other circumstances. As suggested above, the defined cam phase change range allowed does not need to be the same for all transitions. Rather, when desired the permissible range at any time may vary based on the current firing fraction, current engine or vehicle operating parameters, or any other parameters deemed important by the skip fire controller designer.

When no net torque is required a skip fire controlled engine with the ability to close the intake and exhaust valves can disable all cylinders in a mode called decel cylinder cut off (DCCO) has described in U.S. patent application Ser. No. 15/009,533. In this mode the cam phase exercises no control over engine operation, since the valves are deactivated, i.e. closed. Consequently in entering and/or exiting DCCO no waiting is required for the cam to reach a target position.

In still other embodiments, transition tables could be provided that predefine the intermediate firing fractions that are used based on operating conditions, the original and requested firing fractions and/or any other factors deemed important by the skip fire controller designer. Regardless of the selection process used, a significant point is that intermediate target firing fractions can be used in some embodiments, which has the advantage of improving fuel economy during transitions involving large cam phase changes compared to a single stage cam first control strategy.

Although the foregoing description focuses primarily on a staged, cam first transition scheme that utilizes one or more intermediate targets, it should be appreciated that even single stage cam first transition control can advantageously be used in a variety of applications to simplify the management of firing fraction transitions.

It should also be appreciated that the methods described herein related to coordination of the cam phase angle with firing fraction changes during a firing fraction may be applied to other vehicle actuators in addition to cam phase—although the specific control logic may vary based on the nature of the particular actuator. For example, changes in the torque converter slip (or more generally any adjustable drivetrain slip component) can only be implemented relatively slowly, as for example, in ½ to 2 seconds. Often to achieve acceptable NVH performance different firing fraction levels will have different amounts of torque converter slip. For example, torque converter slip may be relatively low at firing fractions of 1 or ½ and higher at firing fractions known to create more NVH.

Unlike optimum cam phase angle, which tends to move monotonically with engine speed and torque request, desired driveline slip has a complex relationship with respective to firing fraction, engine speed, and torque request. Certain firing frequencies can excite vehicle resonances or be particularly annoying to vehicle occupants. These firing frequencies are generally avoided or use higher driveline slip levels to isolate vehicle occupants from the undesirable NVH. Other firing frequencies may produce little undesirable NVH and in these cases slip can be zero, i.e. locked-up TCC, or minimal.

Depending on the nature of the firing fraction transition and the slip levels associated with the initial and final firing fraction levels different control methods may be used. A slip first method or a staged, slip first method, somewhat analogous to the cam first methods described above, may be used when the final slip level is higher than the initial slip level. A concurrent control method, analogous to the cam concurrent control method described relative to FIG. 2B, may be used when the final slip level is lower than the initial slip level and the firing fraction change is small. Employing these various control strategies can improve fuel efficiency during a firing fraction while providing desirable NVH performance. In some embodiments/circumstances, the torque converter slip may be varied simultaneous with changes in cam phase angle such that both the TCC slip and the cam phase and the actual firing fraction transition (or firing fraction transition stage) is delayed until both actuators are positioned adequately.

Figure 5:
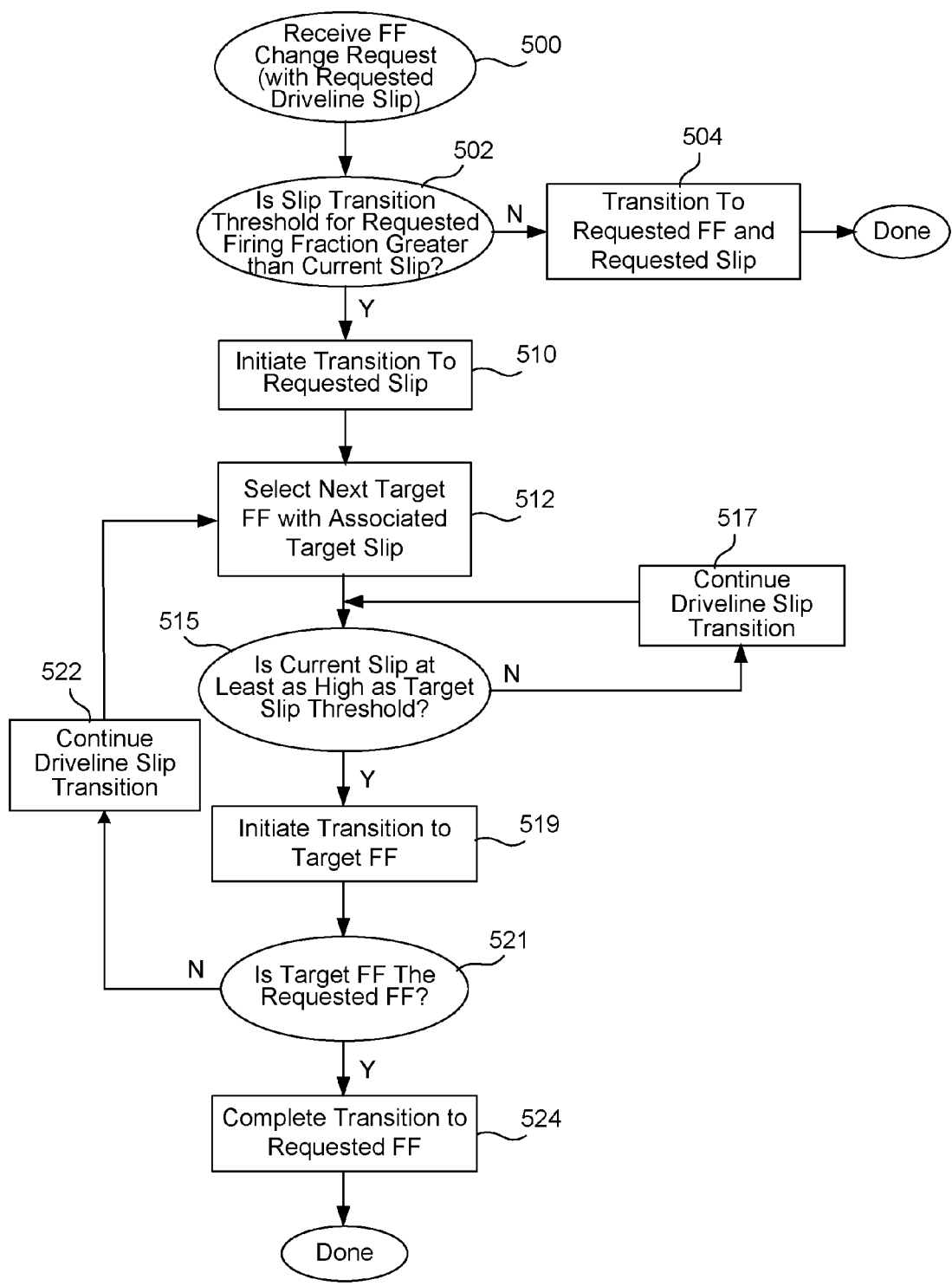
FIG. 5 is a flow chart illustrating a drivetrain slip first firing fraction transition management scheme in accordance with another nonexclusive embodiment.
Figure 6:
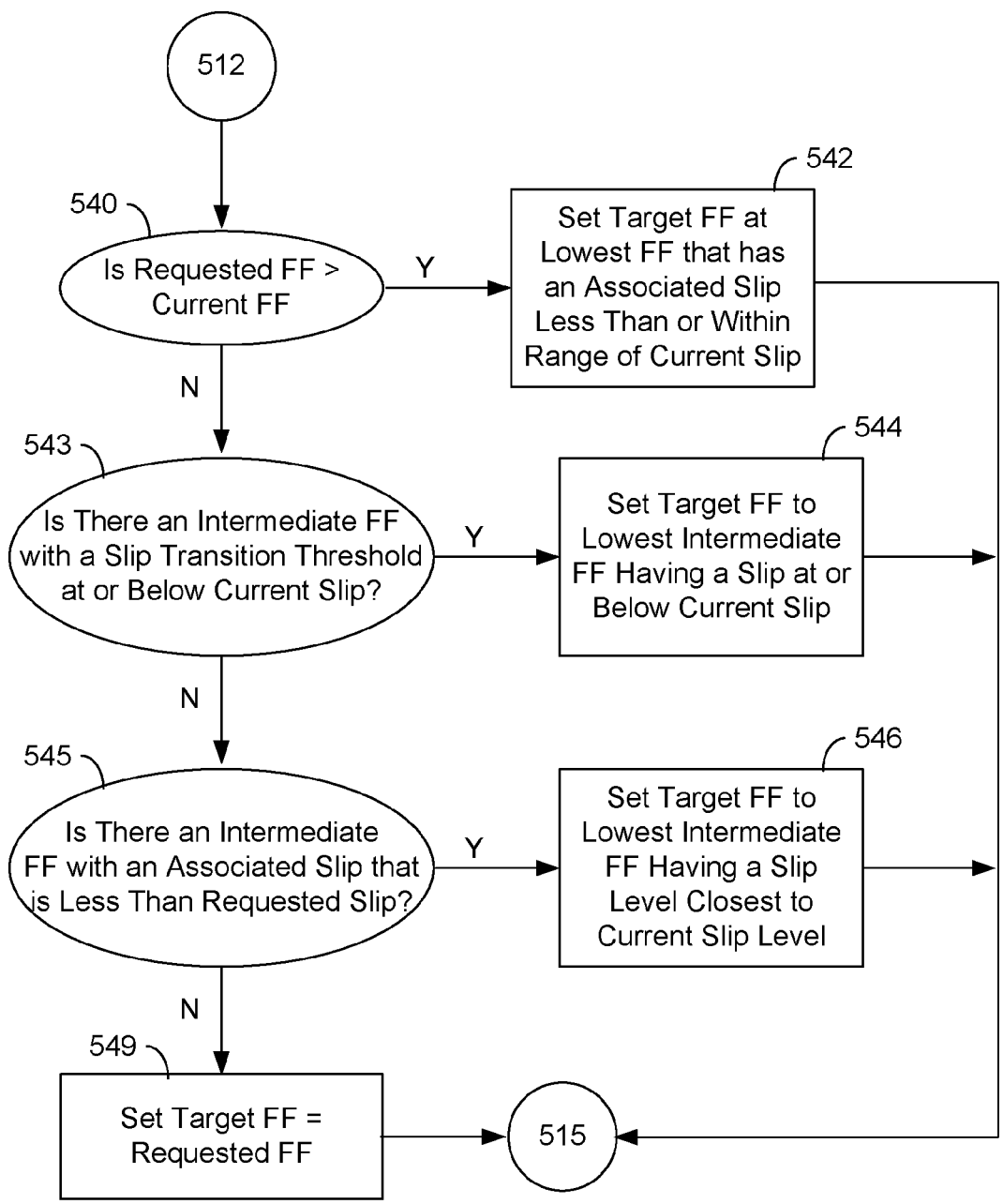
FIG. 6 is a flow chart illustrating a method of selecting a next target firing fraction in the drivetrain slip first firing fraction transition management scheme of FIG. 5.

Referring next to FIGS. 5 and 6, a representative slip first transition approach will be described in more detail. In the illustrated embodiment, the logic flow begins when a firing fraction change request is received as represented by step 500 of FIG. 5. In this embodiment, the requested firing fraction has an associated slip, which we refer to herein as the requested drivetrain slip. In general, the drivetrain slip may be imparted by any drivetrain component that can have its slip actively controlled. Currently, torque converter clutches (TCC) are the most common commercially utilized drivetrain slip control mechanisms and therefore the described embodiment focuses primarily on TCC slip control. However, it should be appreciated that any other mechanism that allows the controlled introduction of slip between an engine crankshaft and downstream power train components can be controlled in a similar manner, as for example, an input clutch of an automated manual transmission or a dual-clutch transmission, etc.

The magnitude of the requested operational slip will often vary based on the requested firing fraction and optionally, a variety of other operating conditions or operating parameters, as for example, engine speed, transmission gear, the magnitude of the torque request, cylinder load, vehicle speed, transmission input shaft speed, driver preferences, road roughness, environmental etc. The requested operational slip may be determined by firing fraction and power train setting determining unit 30 in accordance with the policies and constraints of the vehicle designer. In various embodiments, the appropriate slip values can be can be obtained through the use of look-up tables, algorithmically or via any other suitable approach.

One of the benefits of introducing relatively small amounts of slip to the drivetrain during normal operation of a vehicle is that the slip tends to dampen engine generated vibrations, thereby reducing passenger perceptible NVH and smoothing the vehicle's ride. A drawback of introducing drivetrain slip is that it tends to slightly reduce fuel efficiency. Therefore, the actual slip values deemed appropriate for different firing fractions and different operating conditions are typically selected as a tradeoff between comfort and fuel efficiency. Thus, as a general rule, the more perceptible NVH a firing fraction/operating condition combination is likely to produce, the higher the associated slip will be.

Returning to the flowchart of FIG. 5, the requested slip is compared to the current slip in step 502. The current slip may be retrieved from the slip controller (e.g., a TCC controller) or any other component that maintains such information. Filtering may be provided to reduce noise on the current slip signal. In some embodiments, a TCC controller may be arranged to broadcast or return a current slip level/group in addition to, or in place of the actual current slip value.

In general, the transitions to the requested operational slip and the requested firing fraction may begin substantially immediately if the requested operational slip is less than or equal to the current slip as represented by step 504. In some circumstances, it is also desirable to start both transitions substantially immediately when the requested slip is higher, but close to the current slip—e.g., within a predetermined range of the current slip. That is, when the current (actual) slip is greater than a slip transition threshold, both the firing fraction and drivetrain slip transitions may start as represented by step 504. The nature of the slip transition threshold may vary widely based on the needs of any particular implementation. For example, in some embodiments, the slip transition threshold can simply be the requested operational slip. In other embodiments, the transition threshold can be a predetermined or a designated amount lower than the desired operational slip, which may permit the actual firing fraction change to begin earlier in some operational states. By way of example, the designated slip threshold amount may be a fixed offset relative to the desired operational slip, (as for example, being 5 or 10 rpm below the desired operational slip). In other circumstances the difference between the slip transition threshold and the desired operational slip may vary based on the magnitude of the operational slip and/or various other operating parameters. In various embodiments, the slip threshold may be a known constant offset relative to the operational slip, it may be obtained by reference to a lookup table, algorithmically or in any other suitable manner.

Another relatively simple way to set the slip transition thresholds is to assign a "slip level" or "slip group" to each firing fraction. For example, the firing fraction or fractions having the best NVH characteristic can be assigned the lowest slip level (e.g., level 0), the next best set assigned the next lowest slip level (e.g., level 1) and so on. In such circumstances the logic only needs to determine whether the requested operational slip has the same or lower slip level than the current slip level. Alternatively, each slip level can correspond to a designated range of slips, as for example 0-5 RPM, 5-15 RPM, 15-25 RPM, etc.

The firing fraction change may be accomplished using a cam first transition approach as described above with respect to FIG. 3, by simultaneously changing the firing fraction and air charge, or in accordance with any other desired transition scheme—including, but not limited to the transition schemes described in the various incorporated patents. It is noted that in many circumstances, the firing fraction transition will complete quicker than slip transition—particularly when the requested slip is significantly less than the current slip. This can result in operation in a condition where the actual slip is higher than the requested slip for a relatively brief period of time—which is fine from a drivability standpoint because the NVH damping would always meet or exceed the design goal. Substantially the same logic can apply when the requested slip is a small amount higher than the current slip (i.e., the requested slip is within a (relatively small) predetermined range of the current slip). In such circumstances there can be a small period in which the actual slip is potentially a small amount less than the requested slip. However, as long as the variance is relatively small, it may be deemed acceptable by the system designers. It should also be noted that this same approach can be used regardless of whether the firing fraction change request increases or decreases the operational firing fraction.

When the requested slip (or the slip transition threshold) is higher than the current slip, a transition to the requested slip is initiated as represented by step 510. In this condition, an immediate switch to the requested firing fraction could cause the engine to operate for a brief period at the new firing fraction with a lower drivetrain slip than specified. This can result in more perceptible NVH than desired. To help mitigate this risk, the firing fraction change may be delayed and/or divided into multiple stages in a manner somewhat similar to the approach discussed above for cam first transitions. As such, the transition controller is arranged to identify intermediate target firing fractions that can be used at intermediate stages during the transition as represented by step 512. The intermediate target firing fractions are generally limited to firing fractions capable of delivering the desired engine torque while staying within their designated slip constraints. A few intermediate target selection approaches are described below with respect to FIG. 6.

In some cases, an intermediate target firing fraction candidate will have an associated slip (slip transition threshold or slip level) that is equal to or lower than the current slip. In such cases, the transition to the intermediate firing fraction can initiate right away. In circumstances where all of the other available firing fractions require higher slips (slip levels) than the current slip, a firing fraction with an intermediate slip can be chosen as the next target in step 512. While the slip is transitioning, the actual slip is periodically compared to the target slip transition threshold (step 515, 517). When the actual slip reaches the target slip transition threshold (i.e., reaches or gets close enough to the target slip) a transition to the target firing fraction is initiated as represented by step 519. If the target firing fraction is an intermediate firing fraction (as represented by the no branch of decision 521), the transition to the requested slip continues (522) and the logic returns to step 512 where the next target firing fraction is selected. The process then repeats until the target firing fraction is the requested firing fraction (as represented by the yes branch of decision 521), at which point the transition to the requested firing fraction completes (step 524) and the transition is done.

Since the transition described above takes some time to complete, in practice, the desired engine output (the requested engine torque), will sometimes (indeed often) vary to some extent due to changing driving conditions or other factors. If the change in requested torque is significant enough, it may trigger a change in the requested firing fraction during the course of a transition. The described process handles any such changes quite well. The new firing fraction request triggers the process to restart (return to step 502) and the controller begins managing a transition from the then current state to the newly requested firing fraction.

There are a number of different processes that may be used to select the target firing fraction (step 512) for any iteration. One suitable method will be described next with reference to FIG. 6. As will be apparent from the following discussion, the methods described with respect to FIG. 6 incorporate a number of conceptual approaches that may be utilized together or independently and/or in a variety of different combinations and/or may be modified and/or combined with other approaches.

In the method of FIG. 6, the logic first determines whether the requested firing fraction is higher or lower than the current firing fraction (step 540). When the change request seeks to increase the firing fraction, more torque is typically being requested. In such circumstances, it is often deemed important to almost immediately transition to a firing fraction capable of producing the requested torque so that the driver doesn't experience a power lag. As discussed above, under any particular operating conditions, there will typically be a set of "available" firing fractions and associated powertrain settings that can be used to deliver the desired torque while meeting the designated NVH constraints. Most often, the requested firing fraction will be the lowest of the available firing fractions, and there will very often be one or more other potentially available firing fractions—which would typically be higher than the requested firing fraction and include, at a minimum, an all cylinder operational mode, which corresponds to a firing fraction of 1.

When the requested firing fraction is higher than the current firing fraction (the yes branch of decision 540), the target firing fraction is set to the lowest available firing fraction having an associated slip transition threshold that is at or below the current slip (i.e., has an associated operational slip that is less than, equal to, or within a define range of the current slip). (Step 542). It should be appreciated that when the requested firing fraction has a slip transition threshold that is higher than the current slip, the lowest available firing fraction having a slip at or below the slip transition threshold will often (although not necessarily always) be a firing fraction that is higher than the requested firing fraction. Accordingly, in such cases the first intermediate firing fraction will be higher than the requested firing fraction and subsequent iteration(s) will move back downward towards the requested firing fraction in accordance with the logic of FIG. 5. It should also be appreciated that when no other firing fractions are available that meet the slip transition threshold requirement, the first intermediate firing fraction can always be set to one (i.e., all cylinder operation)—which is expected to be associated with the lowest slip level in most implementations.

Also, the allowed slip for a firing fraction may depend on whether the starting firing fraction is higher or lower than that firing fraction. So if the firing fraction is increasing, it may be desirable to tolerate less slip. Such control methods may be implemented using look-up tables or determined algorithmically.

When the requested firing fraction is less than the current firing fraction (the no branch of decision 540), the logic determines whether there is an intermediate firing fraction (between the current and requested firing fractions) that has an associated slip transition threshold that is less than or equal to the current slip (step 543). If such an intermediate firing fraction exists, then the target firing fraction is set to the lowest available firing fraction that has an associated slip transition threshold that is at or below the current slip (step 544). When there are no intermediate firing fractions that have a slip transition threshold at or below the current slip, then the intermediate fraction having the lowest required slip threshold may be selected (step 549).

In the discussion above, efforts are sometimes made to identify the lowest available firing fraction having a suitable slip. Such firing fractions can be identified using any suitable algorithm. By way of example, in some implementations, a skip fire controller will maintain a list that identifies the set of firing fractions that are able to provide the desired engine output within prescribed NVH criteria under the current operating conditions. This list may be considered a list of available firing fractions. When such a list of available firing fractions is used, the transition logic can first look at the slip threshold associated with the lowest available firing fraction to check whether that slip threshold exceeds the current slip. If so, the next higher firing fraction is checked. If not, that firing fraction is selected as the target.

One side effect of increasing driveline slip is that it increases driveline losses, thereby reducing the power delivered to the wheels for a given engine output. Conversely, reducing driveline slip tend to increase power delivered to the wheels for a given engine output. When desired, the engine controller can be configured to adjust the engine output in parallel with commanded driveline slip changes to partially or fully compensate for TCC or other driveline slip based variations in a manner that reduces or eliminates variations in the brake torque delivered to the wheels during selected operating conditions.

Although a particular logic has been described to facilitate explanation of the invention, it should be appreciated that the actual algorithms or logic used to accomplish the described functions may vary widely and are in no way intended to be limited to the logic flows illustrated in the accompanying flow charts. Rather, various steps and functions may be reordered, altered, added or deleted in accordance with designer preferences and/or the needs of any particular implementation.

Although only a few embodiments of the invention have been described in detail, it should be appreciated that the invention may be implemented in many other forms without departing from the spirit or scope of the invention. For example, it should be appreciated that a variety of other actuators can benefit from the same actuator first control approaches described herein. Such actuators include (but are not limited to) various actuators associated with turbocharger or supercharger air control such as an actuator that controls the position of a waste gate or tumble flap.

In the discussion above, cam first and slip first transition schemes have mostly been described separately. However, it should be appreciated that combinations of slip first and cam first transition control can readily be used. For example, the driveline slip and camshaft phase can be adjusted as necessary in parallel and certain firing fraction transitions (and particularly transitions to lower firing fractions) may be delayed as necessary until both the slip and cam phase have approached or reached their associated targets.

As suggested above, it is generally desirable from a drivability standpoint to maintain the torque output relatively smooth during transitions. In the described cam first transition approach, there are typically two distinct sections associated with any transition. One focuses on transition of the cam phase, the second focuses on transition of the firing fraction. The goal is to make both sections of the transitions smooth so it is generally desirable to utilize other variables to control the overall torque output during each section of the transition.

When the requested engine output stays constant throughout a transition, it is generally desirable to maintain a relatively constant air charge throughout the cam phase transition. In many applications the cam phase and a throttle (to control the manifold pressure) are the primary mechanisms to control/vary the air charge in each cylinder. Therefore, as the cam phase changes, it is desirable to vary the manifold pressure in a complementary way to maintain a relatively constant air charge through the cam phase change. Of course, there are a variety of other ways to vary the air charge as well including valve lift control, exhaust gas recirculation techniques, air boosting techniques such as turbo-charging, supercharging, etc. When the engine includes suitable hardware, any of these air charge control mechanism can be controlled individually, or in parallel to help control the air charge.

Once the desired cam phase has been attained (or is close) the firing fraction is changed. Although it is possible to change the firing fraction almost instantaneously, it is typically not possible to change the air charge as quickly. Therefore, the firing fraction is typically changed over a transition period in a manner that tracks air charge dynamics, which again may be controlled using the throttle or other available mechanisms.

Some skip fire controllers are arranged such that they will inherently invoke a relatively large number of transitions under a variety of normal driving scenarios in an effort to maximize fuel economy. This is particularly true in driving conditions that support a relatively large set of firing fractions. By way of example, some driving tests by Applicants of a skip fire controller having up to 29 available firing fractions tend to average a transition every second or two during various normal driving profiles. In these cases an engine may operate approximately ⅕ of the time in a transition between firing fraction levels. To meet required driving comfort while improving fuel economy, this makes it particularly desirable to utilize some of the transition management approaches described herein.

In the foregoing description, there are several references to the term, "cylinder." The term cylinder should be understood as broadly encompassing any suitable type of working chamber. The figures illustrate a variety of devices, designs and representative cylinder and/or engine data. It should be appreciated that these figures are intended to be exemplary and illustrative, and that the features and functionality of other embodiments may depart from what is shown in the figures.

The invention has primarily been described in the context of dynamic skip fire operation in which an accumulator or other mechanism tracks the portion of a firing that has been requested, but not delivered, or that has been delivered, but not requested. However, the described techniques are equally applicable to managing transitions between any different skip fire firing fractions or between a skip fire firing fraction (in which individual cylinders are sometimes fired and sometime skipped) and all cylinder operation (or operation using a fixed set of cylinders) as may occur when using various rolling cylinder deactivation techniques. Similar techniques may also be used to manage effective displacement transitions in variable stroke engine control in which the number of strokes in each working cycle are altered to effectively vary the displacement of an engine.

The present invention may also be useful in engines that do not use skip fire control. For example, although the invention is described primarily in the context of transitions between different firing fractions during skip fire control, the described techniques can also be used to facilitate transitions between different variable displacement states in more traditional variable displacement engines using a skip fire transition approach. For example, an eight cylinder variable displacement engine that has the ability to operate in a 4 cylinder mode (i.e., 4 fixed cylinders) will require transitions from a firing fraction of 0.5 to 1 and vice versa and could advantageously use the firing fraction transition management techniques described herein. Therefore, the present embodiments should be considered illustrative and not restrictive and the invention is not to be limited to the details given herein.

The invention claimed is:

1. A method of managing firing fraction transitions in a vehicle having a powertrain, the powertrain including an engine and a drivetrain, the drivetrain including an adjustable slip drivetrain component, the method comprising:
    while the engine is operating at a first firing fraction and the adjustable slip drivetrain component is operating at a first drivetrain slip, determining a requested second firing fraction that is different than the first firing fraction, the second firing fraction having an associated second drivetrain slip and an associated second drivetrain slip transition threshold that is higher than the first drivetrain slip;
    initiating a transition from the first drivetrain slip towards the second drivetrain slip;
    transitioning to a target firing fraction that is different than the first and second firing fractions, the target firing fraction (i) being selected from a set of available firing fractions capable of delivering a requested engine output, and (ii) having an associated target drivetrain slip transition threshold that is less than the second drivetrain slip transition threshold; and
    after transitioning to the target firing fraction, transitioning to the second firing fraction, and
    wherein each firing fraction transition is constrained to only occur when an actual driveline slip is at least as high as the associated drivetrain slip transition threshold.

2. The method as recited in claim 1 wherein when the requested second firing fraction is higher than the first firing fraction, the selected target firing fraction is the lowest available firing fraction capable of delivering the requested engine output that has an associated driveline slip transition threshold that is not more than the first drivetrain slip.

3. The method as recited in claim 1 wherein when the requested second firing fraction is lower than the first firing fraction, the selected target firing fraction is an intermediate firing fraction between the first and second firing fractions.

4. The method as recited in claim 3 wherein the selected target firing fraction is the lowest available firing fraction capable of delivering the requested engine output that has an associated driveline slip transition threshold that is not more than the first drivetrain slip.

5. The method as recited in claim 3 wherein the selected target firing fraction has an associated drivetrain slip transition threshold between the first driveline slip and the second driveline slip threshold.

6. The method as recited in claim 1 wherein the adjustable slip drivetrain component is a torque converter clutch (TCC).

7. The method as recited in claim 1 wherein:
    an engine controller that directs the firing fraction transitions has a defined set of potential operational firing fractions;
    at various particular operating conditions, only an associated subset of the potential operational firing fractions are designated as candidates for use;
    the firing fraction candidates for use do not always include all of the potential operational firing fractions that are capable of delivering the requested engine output; and
    the target firing fraction is selected from the firing fraction candidates for use at current operating conditions.

8. The method as recited in claim 1 wherein during each firing fraction transition, a commanded air charge is changed during the transition in a manner that helps provide a desired engine output throughout the transition.

9. The method as recited in claim 1 wherein when the requested firing fraction changes during a transition to a new requested firing fraction, the adjustable slip drivetrain component is commanded to begin transitioning to a driveline slip associated with the new requested firing fraction.

10. The method as recited in claim 1 wherein the set of available firing fractions only includes fractions having a denominator that is not greater than nine and a firing fraction of one.

11. A method of controlling an engine in a vehicle having a powertrain, the powertrain including the engine and a drivetrain, the drivetrain including an adjustable slip drivetrain component, the method comprising:

while the engine is operating at a first firing fraction having an associated first drivetrain component slip, determining a desired second firing fraction and an associated second drivetrain component slip, the second drivetrain component slip being different than the first drivetrain component slip;

initiating a transition from the first drivetrain component slip to the second drivetrain component slip;

after an actual drivetrain component slip is at or within a predetermined range of the second drivetrain component slip, transitioning to the second firing fraction, wherein the transition to the second firing fraction is initiated only after the actual drivetrain component slip is at or within the predetermined range of the second drivetrain component slip; and directing operation of the engine during the transitions to deliver a requested output, whereby an actual commanded firing fraction gradually changes over the course of the transition from the first firing fraction to the second firing fraction.

12. A method of controlling an engine in a vehicle having a powertrain, the powertrain including the engine and a drivetrain, the drivetrain including an adjustable slip drivetrain component, the method comprising:
(a) while the engine is operating at a first firing fraction and the adjustable slip drivetrain component is operating at a first drivetrain slip, determining a requested second firing fraction that is different than the first firing fraction, the second firing fraction having an associated second drivetrain slip, the second drivetrain slip being higher than the first drivetrain slip;
(b) initiating a transition from the first drivetrain slip to the second drivetrain slip;
(c) identifying a target firing fraction that is different than the first and second firing fractions from a set of available firing fractions capable of delivering a requested engine output, the target firing fraction having an associated target drivetrain slip that is less than the second drivetrain slip;
(d) transitioning to the target firing fraction, wherein the transition to the target firing fraction is constrained to only occur when an actual driveline slip is at least as high as a target driveline slip threshold associated with the target firing fraction; and
(e) after transitioning to the target firing fraction, transitioning to the second firing fraction, wherein the transition to the second firing fraction is constrained to only occur when the actual driveline slip is at least as high as a second driveline slip threshold associated with the second firing fraction; and
(f) directing operation of the engine during the transitions to deliver the requested engine output.

13. The method as recited in claim 12 further comprising:
(a) after transitioning to the target firing fraction, transitioning to a next target firing fraction from the set of available firing fractions capable of delivering the requested engine output, the next target firing fraction having an associated driveline slip threshold that is higher than the target driveline slip threshold associated with the target firing fraction and no more than the second driveline slip threshold, wherein the transition to the next target firing fraction is constrained to only occur when an actual driveline slip is at least as high as the next target driveline slip threshold; and
(b) iteratively repeating (a) until the second firing fraction is reached.

14. The method as recited in clam 12 wherein the adjustable slip drivetrain component is a torque converter clutch (TCC).

15. A method of controlling an engine in a vehicle having a powertrain, the powertrain including the engine and a drivetrain, the drivetrain including a torque converter clutch (TCC), the method comprising:
(a) while the engine is operating at a first firing fraction and the torque converter is operating at a first slip, determining a requested firing fraction that is lower than the first firing fraction, the requested firing fraction being a second firing fraction having an associated second torque converter slip, the second torque converter slip being higher than the first torque converter slip;
(b) initiating a transition from the first torque converter slip to the second torque converter slip;
(c) selecting an intermediate firing fraction that is between the first and second firing fractions, the intermediate firing fraction having an associated torque converter slip;
(d) identifying the selected intermediate firing fraction as a target firing fraction;
(e) transitioning to the target firing fraction, wherein the transition to the target firing fraction is constrained to only occur when an actual torque converter slip is at least as high as, or within a predetermined range of the torque converter slip associated with the target firing fraction;
(f) when the target firing fraction is not the second firing fraction, selecting a next firing fraction having an associated next torque converter slip and setting the target firing fraction to be the next firing fraction;
(g) iteratively repeating (e) and (f) until the requested firing fraction is reached; and
(h) directing operation of the engine during the transitions to deliver a requested output.

16. The method as recited in claim 15 wherein the intermediate firing fraction is determined by selecting a lowest firing fraction candidate that has an associated torque converter slip that is no greater than or within a predefined range of the first torque converter slip at current operating conditions.

17. The method as recited in claim 16 wherein the next firing fraction is determined by selecting the lowest firing fraction candidate that has an associated torque converter slip within a predefined range of a then current target torque converter slip.

18. The method as recited in claim 15 wherein:
an engine controller that directs the firing fraction transitions has a defined set of firing fraction candidates;
each target firing fraction is selected from the firing fraction candidates for use at current operating conditions.

19. A powertrain controller arranged to direct skip fire operation of an engine and to direct a slip setting of a drivetrain component, the powertrain controller being configured to:
direct operation of the engine at a first firing fraction and direct operation of the drivetrain component at a first slip;
while the engine is operating at the first firing fraction and the adjustable slip drivetrain component is operating at the first drivetrain slip, determine a requested second firing fraction that is different than the first firing fraction, the second firing fraction having an associated second drivetrain slip and an associated second drivetrain slip transition threshold that is higher than the first drivetrain slip;

initiate a transition from the first drivetrain slip towards the second drivetrain slip;

direct transition to a target firing fraction that is different than the first and second firing fractions, the target firing fraction (i) being selected from a set of available firing fractions capable of delivering a requested engine output, and (ii) having an associated target drivetrain slip transition threshold that is less than the second drivetrain slip transition threshold; and after directing transition to the target firing fraction, direct transition to the second firing fraction, wherein each firing fraction transition is only directed when an actual driveline slip is at least as high as the associated drivetrain slip transition threshold.

20. The powertrain controller as recited in claim 19, wherein the powertrain controller has a defined set of potential operational firing fractions;

at various particular operating conditions, only an associated subset of the potential operational firing fractions are designated as candidates for use;

the firing fraction candidates for use do not always include all potential operational firing fractions that are capable of delivering the requested engine output; and each target firing fraction is selected from the firing fraction candidates for use at current operating conditions.

21. A powertrain controller arranged to direct skip fire operation of an engine and to direct a slip setting of a drivetrain component, the powertrain controller being configured to:

direct operation of the engine at a first firing fraction and operation of the first drivetrain component at a first drivetrain component slip;

while the engine is operating at the first firing fraction and the first drivetrain component is operating at the first drivetrain component slip, determine a desired second firing fraction and an associated second drivetrain component slip, the second drivetrain component slip being different than the first drivetrain component slip;

initiate a transition from the first drivetrain component slip to the second drivetrain component slip;

after an actual drivetrain component slip is at or within a predetermine range of the second drivetrain component slip, direct a transition to the second firing fraction, wherein the transition to the second firing fraction is initiated only after the actual drivetrain component slip is at or within the predetermined range of the second drivetrain component slip; and direct operation of the engine during the drivetrain component slip and firing fraction transitions to deliver a requested output.

* * * * *